United States Patent [19]
Takahashi et al.

[11] Patent Number: 5,293,408
[45] Date of Patent: Mar. 8, 1994

[54] FSK DATA RECEIVING SYSTEM

[75] Inventors: Kazuaki Takahashi, Kawasaki; Makoto Hasegawa, Setagaya; Katsushi Yokozaki, Yokohama; Yasumi Imagawa; Hiroyuki Harada, both of Kanazawa; Masahiro Mimura, Suginami; Yasuaki Namura, Yokohama, all of Japan

[73] Assignee: Matsushita Electric Industrial Co., Ltd., Japan

[21] Appl. No.: 942,183

[22] Filed: Sep. 9, 1992

[30] Foreign Application Priority Data

Oct. 14, 1991 [JP] Japan .................................. 3-264464
Jun. 12, 1992 [JP] Japan .................................. 4-153240
Jun. 26, 1992 [JP] Japan .................................. 4-168834

[51] Int. Cl.⁵ .............................................. H04B 1/10
[52] U.S. Cl. ..................................... 375/102; 375/88; 329/300; 329/303

[58] Field of Search ..................... 375/45, 88, 89, 102; 329/300, 302, 303; 455/102

[56] References Cited
FOREIGN PATENT DOCUMENTS
64-84948 3/1989 Japan .

Primary Examiner—Curtis Kuntz
Assistant Examiner—Bryan E. Webster
Attorney, Agent, or Firm—Parkhurst, Wendel & Rossi

[57] ABSTRACT

A data receiving system comprising an I base-band signal and a Q base-band signal which are used in a quadrature demodulation operation. Zero-crossing points of respective base-band signals are detected and a control signal is generated in response to each zero-crossing point. A phase-shift switching circuit alternately selects either the I base-band signal or the Q base-band signal in response to the control signal to generate an I/Q base-band signal. And, a demodulation operation is executed on the basis of the I/Q signal.

49 Claims, 28 Drawing Sheets

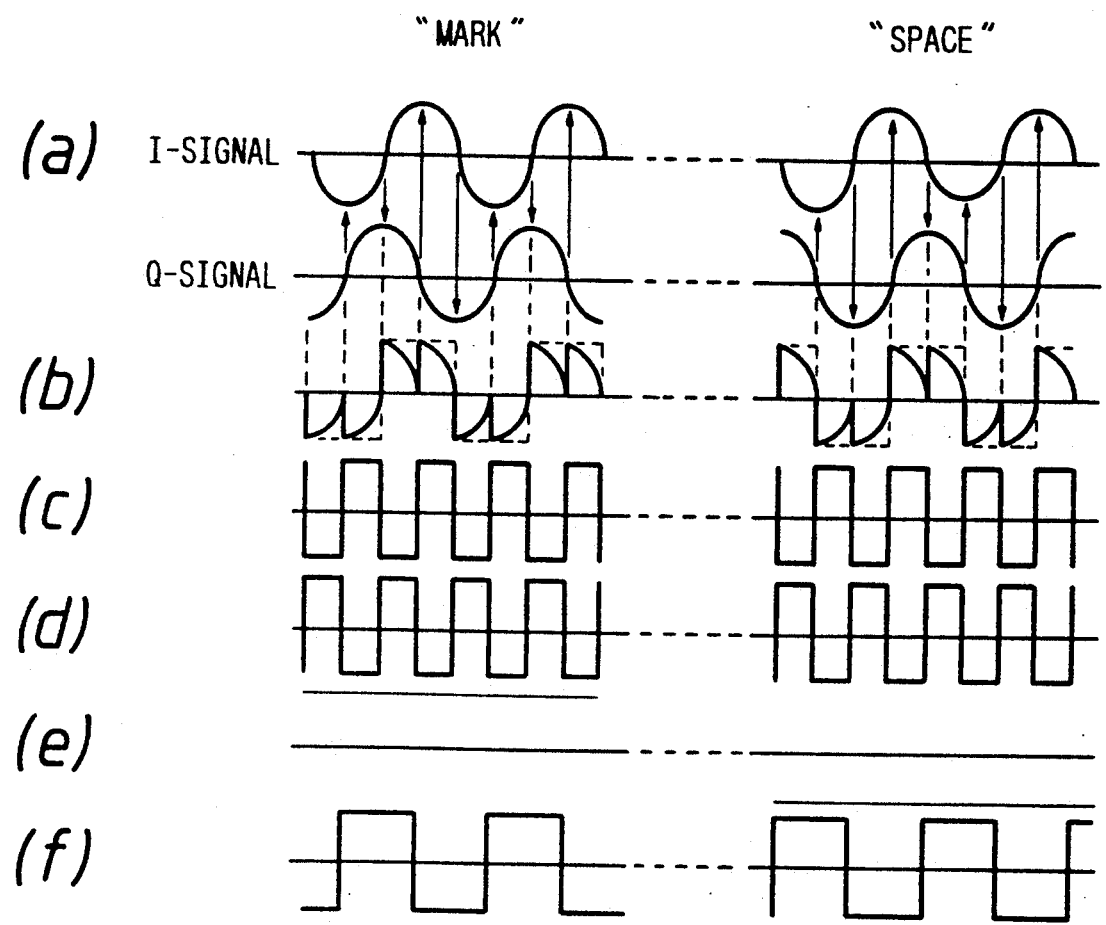

FSK DATA RECEIVING SYSTEM

BACKGROUND OF THE INVENTION

1. Field of the Invention

The present invention relates to a data receiving system for receiving frequency shift keyed (FSK) signals, and more particularly to a direct-conversion type FSK-data receiving system suitable for realizing a small sized apparatus and a low-power consumption.

2. Description of the Prior Art

A direct-conversion system has been used as a receiver suitable for integration and adopted to a pager-type receiving apparatus and the like recently. Some of already known systems are, for example, a demodulation system which carries out a demodulation based on a phase relationship between a pair of quadrature channels and a demodulation system which carries out a demodulation based on a frequency difference between an output signal obtained from a carrier wave signal frequency and an output signal obtained from a local oscillator signal frequency being slightly offset from the carrier wave and so on.

Also, already known system is a demodulation system which consists of one series of high-frequency circuit portions and shifts a phase of a local oscillator signal so as to execute a demodulation. (For example, refer to Japanese Laid-open Patent Application No. SHO 64-84948)

This conventional direct-conversion receiving system is explained hereinafter with reference to FIG. 32.

In FIG. 32, a reference numeral 501 denotes a frequency converter, and a reference numeral 502 denotes a filter circuit. A reference numeral 503 denotes a limiter circuit, and a reference numeral 504 denotes an exclusive-OR circuit. A reference numeral 505 denotes a counter circuit, and a reference numeral 506 denotes a shift register circuit. A reference numeral 507 denotes a switching control circuit, and a reference numeral 508 denotes a 0°/90° phase-switching circuit. Further, a reference numeral 509 denotes a local oscillator.

An operation of the direct-conversion receiving system constituted as above is explained as follows.

In a first-half of an FSK-modulated 1-bit data, the 0°/90° phase-switching circuit 508 is set to 0°. And the FSK-modulated data is converted into a base-band signal in the frequency converter 501 and subsequently sent through the filter circuit 502, the limiter circuit 503 to the shift register circuit 506 to store its waveform.

On the other hand, in a second-half of the FSK-modulated 1-bit data, the 0°/90° phase-switching circuit 508 is set to 90°. And, in the same manner, the FSK-modulated data is shaped its waveform through the frequency converter 501, the filter circuit 502, and the limiter circuit 503.

The waveform of the first-half of the FSK-modulated 1-bit data which is previously stored in the shift register circuit 506 is read out from a last written part (last-in last-out) by being offset by an amount of 90°. Then, thus read out waveform is supplied together with the second-half waveform of the FSK-modulated 1-bit data to the exclusive-OR circuit 504.

As to a phase change, an output base-band signal from the exclusive-OR circuit 504 changes +90°/−90° in accordance with the FSK-modulated signal data by the 0°/90° phase change of the local oscillator signal.

By reading out the waveform stored in the shift register 506 by offsetting 90°, the read out signal becomes the same-phase or the opposite-phase with respect to the local oscillator signal being switched by an amount of 0°/90°. Therefore, by checking an exclusive-OR result of both signals, a judgement of "1"/"0" becomes possible.

However, in accordance with the above-described conventional system, since the phase of the local oscillator signal is changed between the first-half and the second-half of the 1-bit data, a measure for synchronizing with the 1-bit data becomes requisite for this system.

Furthermore, in the case where a frequency deviation of the FSK-modulated signal is small compared with the transmission speed, a signal period included in 1-bit data becomes small. Therefore, it becomes difficult to check an interrelationship between a first-half waveform and a second-half waveform in the 1-bit data.

Moreover, in the case where the frequency of the local oscillator signal is offset, in either side of a plus or a minus of the FSK-modulated data, a signal period included in 1-bit data becomes also small. Therefore, its demodulation becomes difficult as well as the case where the transmission speed is high.

Still further, since the local oscillator is associated with the phase-shift circuit, the local oscillator requires a large output power to compensate the loss in the phase-shift circuit. Also, in a direct conversion receiver, it may happen that the local oscillator signal leaks toward the received carrier wave signal since both signals have substantially the same frequencies.

On the other hand, an another example of already known FSK data receiving systems is disclosed in Japanese Laid-open Patent Application No. SHO 55-14701. This conventional system is explained hereinafter with reference to FIG. 33.

In FIG. 33, a reference numeral 560 denotes an input terminal of FSK data receiving system, and reference numerals 561, 562 denote mixers. A reference numeral 563 denotes a local oscillator, and a reference numeral 564 denotes a 90° phase-shift circuit. Reference numerals 565, 566 denote low-pass filters, and reference numerals 567, 568 denote I-signal and Q-signal, respectively.

Further, reference numerals 569, 570 denote limiter amplifiers, and reference numerals 571, 572 denote digital signals. A reference numeral 573 denotes a D-type flip-flop circuit, and a reference numeral 574 denotes its output signal.

With this arrangement, an FSK data inputted into the input terminal 560 is supplied to both the mixer 561 and the mixer 562 at the same time. A local oscillator signal generated from the local oscillator 563 is supplied to the mixer 561 to mix with the FSK data. The local oscillator is also supplied to the 90° phase-shift circuit 564. An output signal from the 90° phase-shift circuit 564 is supplied to the mixer 562 to mix with the FSK data.

An output signal from the mixer 561 is sent to the low-pass filter 565 to generate the I-signal 567. On the other hand, an output signal from the mixer 562 is sent to the low-pass filter 566 to generate the Q-signal 568.

The I-signal 567 and the Q-signal 568 are transformed into digital signals 571 and 572 through the limiter amplifiers 569 and 570, respectively.

The digital signal 571 is inputted into a data input terminal of the D-type flip-flop circuit 573, and the digital signal 572 is inputted into a clock input terminal of the D-type flip-flop circuit 573. The D-type flip-flop 573 generates the output signal 574 which is used for a demodulation.

However, in such a conventional data receiving system, the digital signals are obtained by directly inputting the I-signal and the Q-signal into the limiter amplifiers. Therefore, if the base-band signal has a small voltage close to a judging voltage of the limiter amplifier, noises may cause the I/Q signal to accidentally cross the judging voltage of the limiter amplifier, thus generating undesirable error digital signals. Consequently, a demodulation becomes difficult.

SUMMARY OF THE INVENTION

The present invention has a purpose, in order to solve above-mentioned problems, to provide an FSK-data receiving system which is capable of demodulating an FSK-signal with a simple circuit constitution in a high-frequency circuit requiring a significant electric power consumption, which requires no measure for synchronizing with transmission data signal in the base-band signal processing, which can execute a demodulation even if a transmission speed is high or even if a frequency of a local oscillator signal is offset, and which can save a significant amount of electric power consumption.

Furthermore, the present invention has a purpose to provide an data receiving system which can execute a demodulation with a large noise margin by alternately selecting the I-signal or Q-signal at their zero-crossing points, and which can obtain signals equivalent to digitized I/Q signals from a simply constituted circuit, so that this novel system can be assembled with a conventional digital quadrature demodulation circuit to improve a noise characteristics of the demodulation system, or can be adopted to a demodulation system suitable for a direct conversion receiving system having an integrated circuit so as to realize a superior noise characteristics.

Moreover, the present invention has a purpose to provide a data receiving system which can receive FSK-modulated signal without consuming a large electric power in the local oscillator.

To accomplish above purposes, a first aspect of the present invention provides a data receiving system comprising: a mixer which produces a base-band signal based on a carrier wave signal with frequency deviations and a local oscillator signal having substantially the same frequency as the carrier wave signal; a means for detecting a standard voltage of said base-band signal so as to invert a sign of an output voltage at the timing the standard voltage is detected; a means for causing said local oscillator signal to shift a 0°-phase or 90°-phase in response to an output signal of said standard voltage detecting means; a first means for mixing said base-band signal and said output signal from said standard voltage detecting means; and a first demodulation means for executing a sign judgement on the basis of said base-band signal and said mixed signal obtained in the first means.

Furthermore, there are provided a means for generating pulses at predetermined time intervals in response to an output voltage change of said standard voltage detecting means; a means for causing the local oscillator signal to shift a 0°-phase or a 90°-phase in accordance with a sign of said pulse signal; and a fourth demodulation means for executing a demodulation based on the sign change of the base-band signal voltage with respect to the standard voltage in any one or both of the changing points of said 0° and 90° phase-shifts.

With these arrangements of the present invention, the FSK-modulated carrier wave signal can be transformed into the base-band signal in one mixer. And, by causing the local oscillator signal to have 0° phase-shift or 90° phase-shift at the timing the base-band signal crosses the standard voltage, a next intersection of the standard voltage appears after a time period corresponding to 90-degree phase. That is, thus obtained base-band signal becomes equivalent to a signal obtained by intermittently switching I/Q signals in the quadrature demodulation system.

Positive/negative sign of its waveform depends on the FSK-modulated data. Therefore, by mixing the base-band signal and the phase control signal of the local oscillator signal, a 90° advance or a 90° delay is realized with respect to the change of the FSK-modulated data. Accordingly, if either of both signals is delayed by a time corresponding to 90-degree phase, both signals become in-phase or opposite-phase in relation to the change of the FSK-modulated data. Thus, using a conventional quadrature demodulation circuit and the like, a demodulation can be easily realized.

Moreover, without using a quadrature demodulation circuit, by causing a 0° phase-shift or a 90° phase-shift to the base-band signal at the intersecting point of the base-band signal with respect to the standard voltage, a demodulation can be easily executed based on the waveform change of the base-band signal at that timing.

Still further, in addition to above-described demodulation circuit, by combining a functional measure for judging a frequency of the base-band signal and a demodulation signal obtained from said demodulation circuit, it becomes possible to detect a frequency offset amount of the local oscillator signal and its offset direction. Therefore, the demodulation can be surely carried out even in the case where the local oscillator signal includes a frequency offset.

A second aspect of the present invention provides a data receiving system comprising a first and a second base-band signals which have quadrature phases with each other and whose phase relationship is relatively inverted in accordance with a positive and a negative frequency deviations of a carrier wave signal; a signal selecting means for inputting said first and second base-band signals and alternately selecting either of them to generate a third base-band signal; and a standard voltage detecting means for comparing the third base-band signal with a standard voltage to generate a control signal when the third base-band signal crosses the standard voltage.

Then, the demodulation can be carried out on the basis of the third base-band signal and the control signal.

Furthermore, there is provided a mixer means for mixing the third base-band signal and the control signal. An output signal from this mixer means is supplied to a conventional quadrature demodulation circuit together with the third base-band signal.

A third aspect of the present invention provides a data receiving system comprising: a carrier wave signal being modulated with a frequency deviation; a control signal generating means for generating a control signal; a phase-shift switching means for switching a phase of the carrier wave signal; a local oscillator means for generating a local oscillator signal having substantially the same frequency as the carrier wave signal; a mixer means for mixing said local oscillator signal and an output signal from said phase-shift switching means; a low-pass filter means for generating a first base-band signal from the output of the mixer means; and a demodulation means for executing a demodulation based on said first base-band signal.

The above and other objects, features and advantages of the present invention will become more apparent from the following detailed description which is to be read in conjunction with the accompanying drawings.

BRIEF DESCRIPTION OF THE DRAWINGS

FIGS. 21(a)~21(f) are views showing signal waveforms of essential portions of the FSK data receiving system for showing an operation of the sixth embodiment (partly a seventh embodiment) of the present invention;

DETAILED DESCRIPTION OF THE PREFERRED EMBODIMENTS

Hereinafter, referring now to the accompanying drawings, embodiments of the present invention are explained in detail.

FIRST EMBODIMENT

Figure 1:
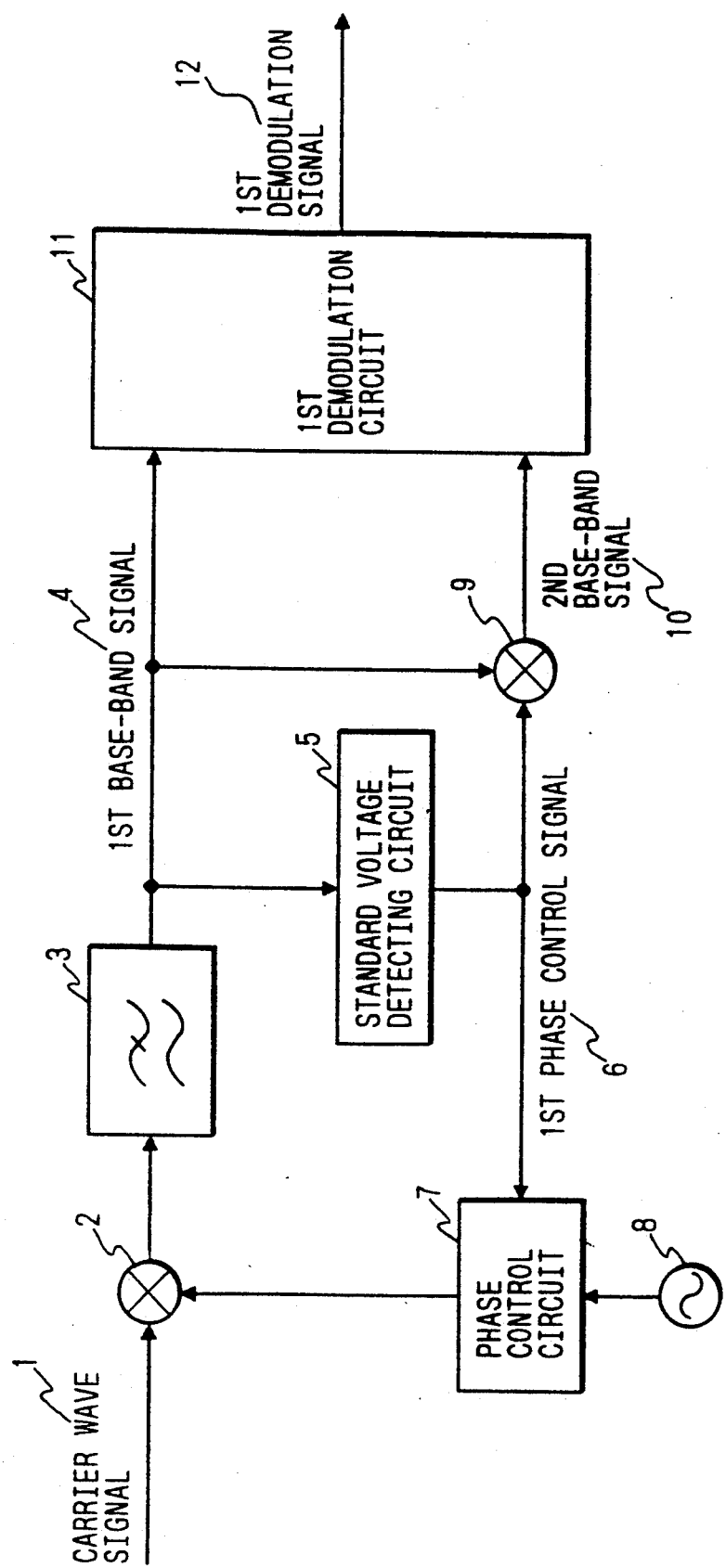
FIG. 1 is a circuit block diagram showing an FSK data receiving system in accordance with a first embodiment of the present invention.

FIG. 1 is a circuit block diagram showing an FSK data receiving system in accordance with a first embodiment of the present invention.

In FIG. 1, a reference numeral 1 denotes a carrier wave signal. The carrier wave signal 1 is converted in a form of a base-band in a mixer 2 and is, after having passed a low-pass filter 3, outputted as a first base-band signal 4. The first base-band signal 4 is inputted into a standard voltage detecting circuit 5 so that a first phase control signal 6 is outputted from the standard voltage detecting circuit 5.

A reference numeral 7 is a phase control circuit which inputs an output signal of a local oscillator circuit 8 and whose output signal is supplied to the mixer 2. A reference numeral 9 denotes a base-band mixer which inputs the first base-band signal 4 and the first phase control signal 6 to mix with each other and outputs a second base-band signal 10.

A reference numeral 11 denotes a first demodulation circuit which inputs the first base-band signal 4 and the second base-band signal 10 and outputs a first demodulation signal 12.

Figure 2:
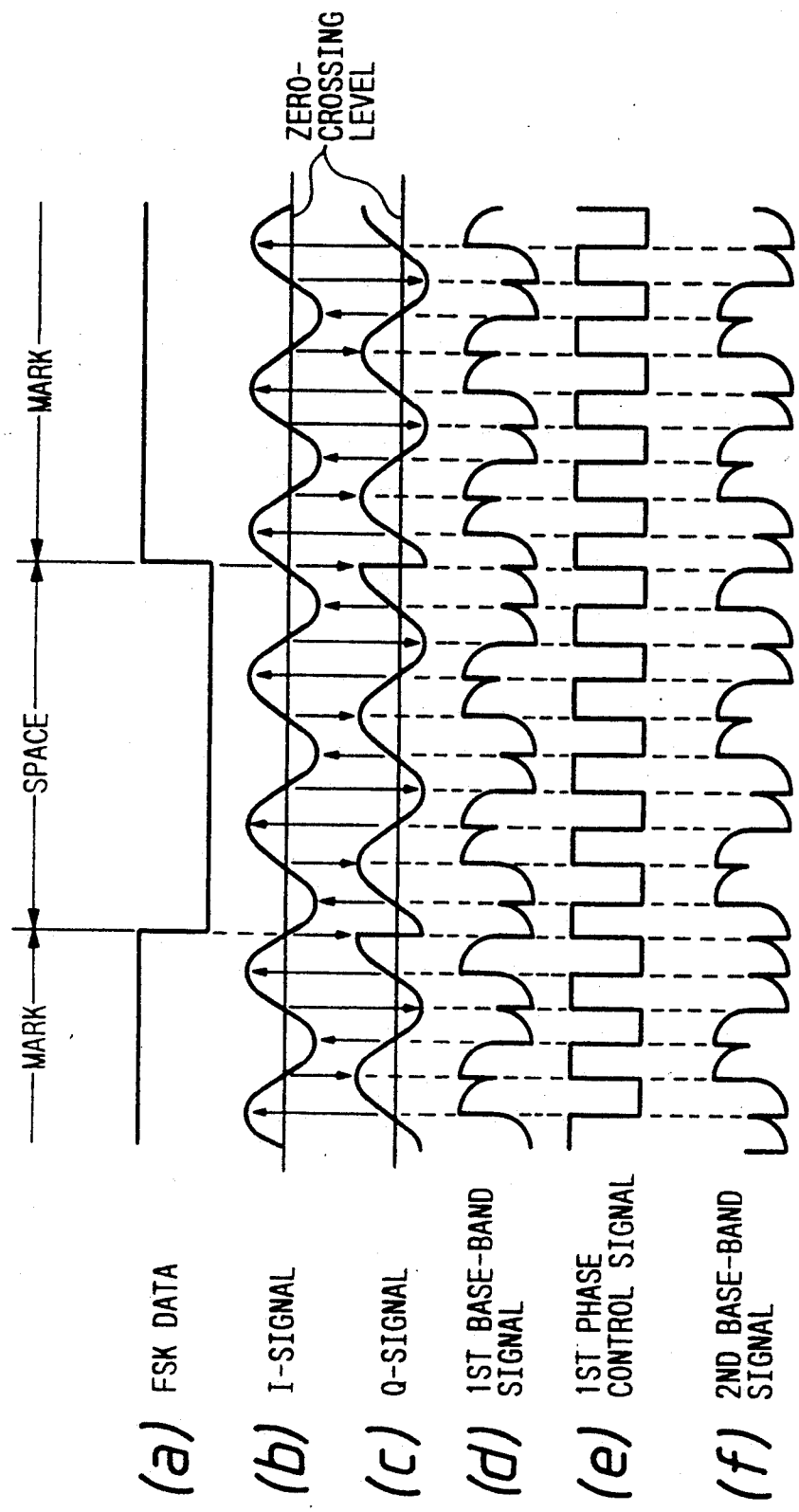
FIGS. 2(a)~2(f) are signal waveforms of main portions showing an operation of the FSK data receiving system in accordance with the first embodiment of the present invention.

An operation of the FSK data receiving system constituted as above is explained with reference to signal waveforms shown in FIG. 2.

First of all, the carrier wave signal 1 which is FSK-modulated by a transmission data signal (FIG. 2(a)) is transformed into a base-band signal in the mixer 2 and sent to the low-pass filter 3. After having passed the low-pass filter 3, the first base-band signal 4 (FIG. 2(d)) is outputted.

For example, if supposed that a standard voltage of the standard voltage detecting circuit 5 is set to be 0 V, the standard voltage detecting circuit 5 detects a zero-crossing point of the first base-band signal where the first base-band signal 4 crosses the standard voltage of 0 V. At the timing the zero-crossing point is detected, the standard voltage detecting circuit 5 changes a voltage of its output signal. This output signal from the standard voltage detecting circuit 5 serves as the first phase control signal 6 (FIG. 2(e)).

In this case, it is desirable for the standard voltage detecting circuit 5 not to detect unnecessary zero-crossing points occurring due to noises during the phase switching operation or a time-lag of the phase switching operation itself. For avoiding such a malfunction, the standard voltage detecting circuit 5 in accordance with the present invention is constituted to inhibit a detecting operation during a predetermined time period shortly after the zero-crossing point has been detected.

Figure 3:
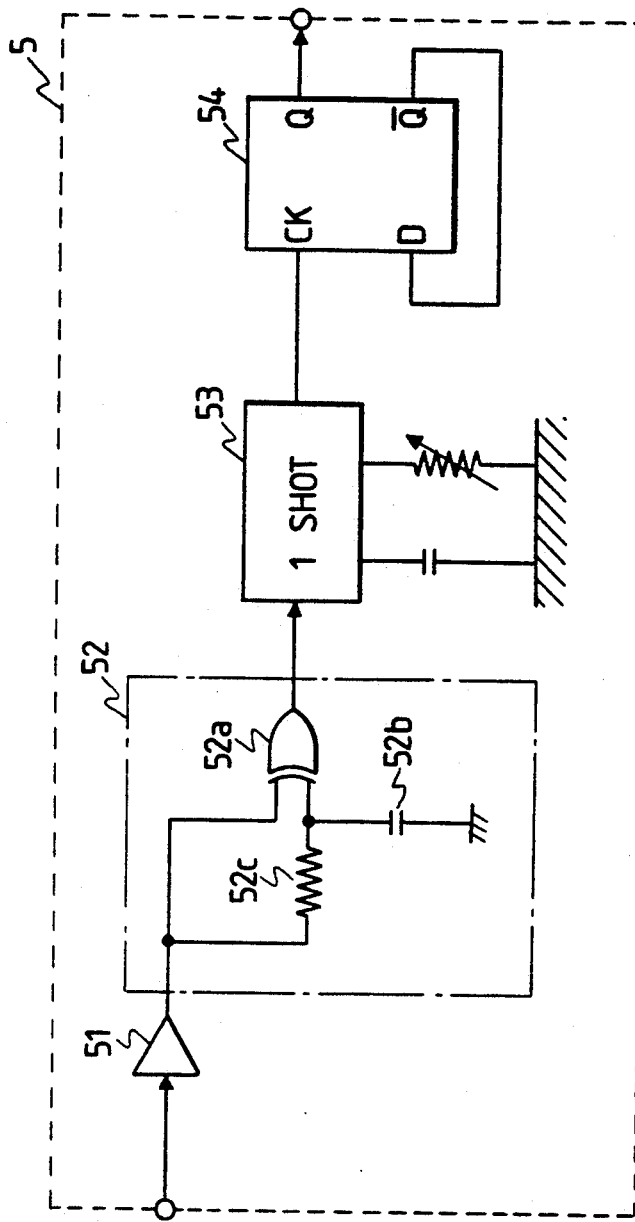
FIG. 3 is a circuit diagram showing a standard voltage detecting circuit of the FSK data receiving system in accordance with the first embodiment of the present invention.

FIG. 3 shows details of the standard voltage detecting circuit 5. In FIG. 3, a reference numeral 51 denotes a comparator, and a reference numeral 52 denotes an edge detecting circuit. A reference numeral 53 denotes an one-shot trigger circuit, and a reference numeral 54 denotes a D-type flip-flop circuit. The edge detecting circuit 52 includes an exclusive-OR circuit 52a having two input terminals. One input terminal of the exclusive-OR circuit 52a is connected to one end of a capacitor 52b serving as a reference capacitance for comparing voltages. The other end of the capacitor 52b is grounded. A resistance 52C is connected between the comparator 51 and a connecting point of the one end of the capacitance 52b and above-described one input terminal of the exclusive-OR circuit 52a.

The first base-band signal 4 is inputted through the comparator 51 into the edge detecting circuit 52, so that it is checked whether or not the first base-band signal 4 crosses 0 V. Then, an output from the edge detecting circuit 52 is supplied to the one-shot trigger circuit 53. In response to the output from the edge detecting circuit 52, the one-shot trigger circuit 53 generates an edge signal.

But, if the one-shot trigger circuit 53 once outputs the edge signal, then the output from the edge detecting circuit 52 is ignored during a predetermined period of time after the edge signal has generated. That is, this one-shot trigger circuit 53 serves to inhibit a detecting operation of the standard voltage detecting circuit 5 during a predetermined time period shortly after the zero-crossing point has been detected.

Then, the edge signal outputted from the one-shot trigger circuit 53 is inputted into the flip-flop circuit 54 so that the first control signal 6 having a rectangular-waveform voltage can be produced, as shown in FIG. 2(e).

The phase control circuit 7 changes over the phase of the output signal of the local oscillator circuit 8 between 0-degree phase-shift and 90-degree phase-shift in accordance with the voltage of the first phase control signal 6.

Figure 4:
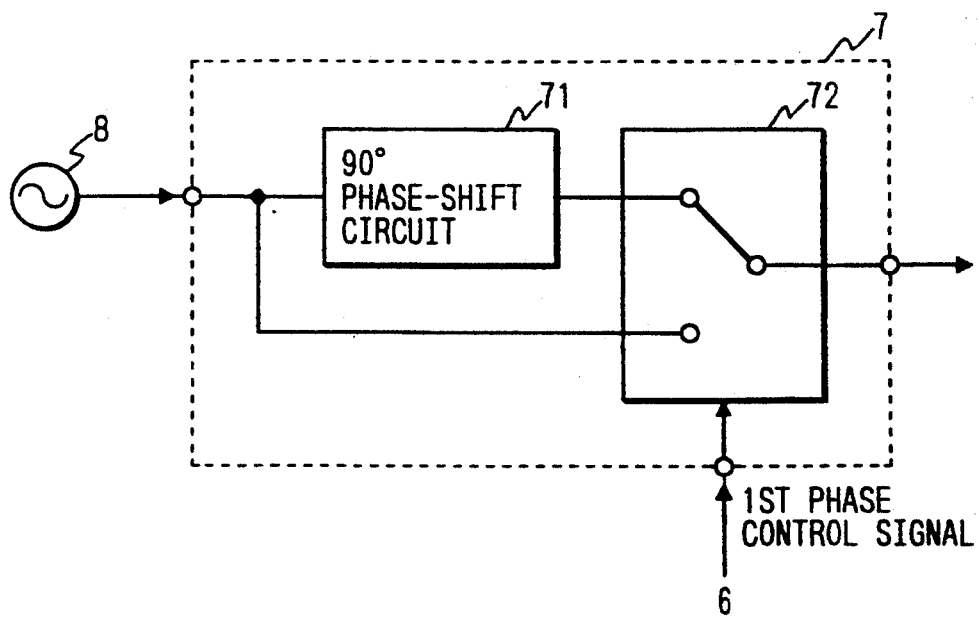
FIG. 4 is a circuit diagram showing one example of a phase control circuit of the FSK data receiving system in accordance with the first embodiment of the present invention.
Figure 7:
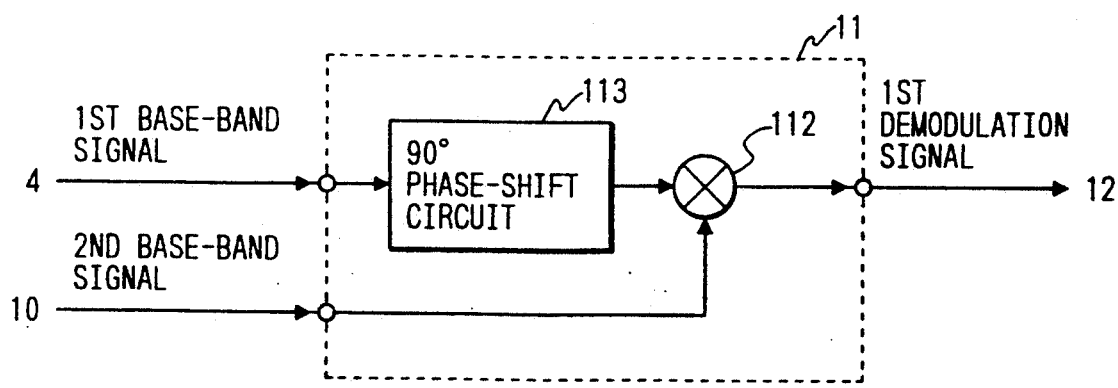
FIG. 7 is a circuit diagram showing another example of the first demodulation circuit of the FSK data receiving system in accordance with the first embodiment of the present invention.

FIG. 4 shows one example of a phase control circuit 7. In FIG. 7, a reference numeral 71 denotes a 90° phase shift circuit, and a reference numeral 72 denotes an analogue switch.

With this arrangement, the output signal of the local oscillator 8 is on one hand supplied directly to one input terminal of the analogue switch 72 and is on the other hand supplied through the 90° phase shift circuit 71 to the other input terminal of the analogue switch 72. The analogue switch 72 changes over its output between these two inputs on the basis of the voltage of the first phase control signal 6.

Figure 5:
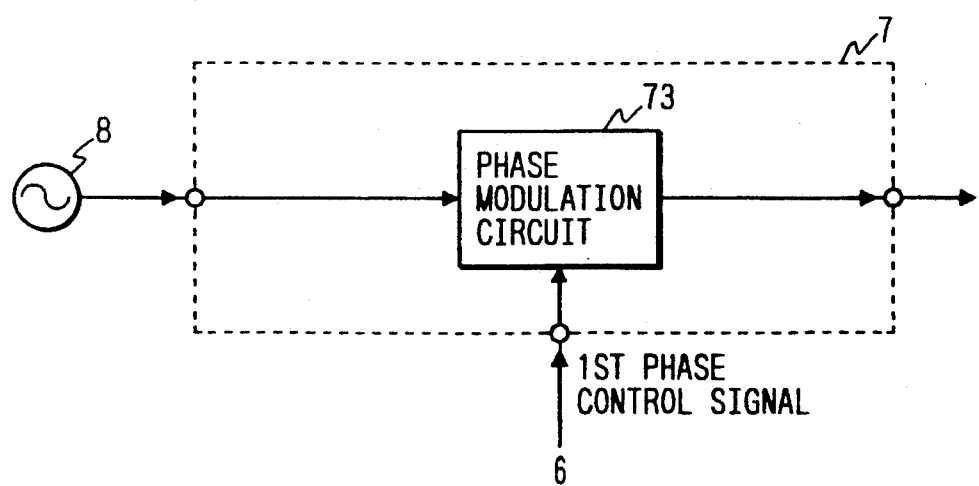
FIG. 5 is a circuit diagram showing another example of the phase control circuit of the FSK data receiving system in accordance with the first embodiment of the present invention.

Moreover, FIG. 5 shows another example of the phase control circuit 7. In FIG. 5, a reference numeral 73 denotes a phase modulation circuit. The output signal from the local oscillator 8 is inputted into this phase modulation circuit 73. And, the phase modulation circuit 73 acts to switch the phase of the local oscillator signal between 0° phase-shift and 90° phase-shift.

The base-band mixer 9 mixes the first base-band signal 4 and the first phase control signal 6 so as to obtain the second base-band signal 10 (FIG. 2(f)).

I-signal and Q-signal disclosed in FIGS. 2(b) and 2(c), respectively, show base-band signals used in a conventional quadrature demodulation. In this embodiment, if these I/Q signals are alternately switched in response to the sign of the first phase control signal 6, a next zero-crossing point is generated after a time corresponding basically to a subsequent 90-degree phase. And a waveform signal whose positive or negative depends on the FSK-modulated data is outputted as the first base-band signal 4.

In the case where the FSK-modulated data is "mark", the second base-band signal 10 is delayed with respect to the first base-band signal 4 to have a waveform which is delayed by an amount corresponding to a 90-degree phase of the I/Q signal. Furthermore, in the case where the FSK-modulated data is "space", the second base-band signal 10 is advanced with respect to the first base-band signal 4 to have a waveform which is advanced by an amount corresponding to a 90-degree phase of the I/Q signal.

In this manner, the phase relationship between two signals changes +90 degree or −90 degree in accordance with a data value of "mark" or "space" of the FSK-modulated data. Therefore, in the same manner as the I/Q signals in the conventional quadrature demodulation, if either signal is delayed against another one, then these two signals become mutually in-phase or opposite-phase in response to the FSK-modulation data. That is, a demodulation can be carried out by delaying either one of these signals by 90 degrees and then mixing them with each other. Accordingly, the first demodulation circuit 11 can be constituted by almost any type of circuit as long as it can execute a conventional demodulation operation.

Figure 6:
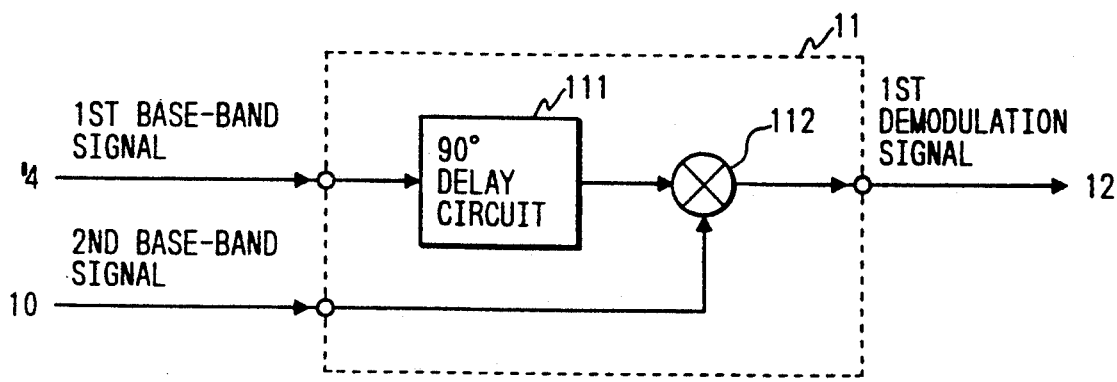
FIG. 6 is a circuit diagram showing one example of a first demodulation circuit of the FSK data receiving system in accordance with the first embodiment of the present invention.

FIG. 6 shows one example of the first demodulation circuit 11 of the first embodiment. In FIG. 6, a reference numeral 111 denotes a 90° delay circuit, and a reference numeral 112 denotes a mixer. Namely, the first base-band signal 4 is inputted into the 90° delay circuit 111 and supplied to the mixer 112. On the other hand, the second base-band signal 10 is inputted into the mixer 112 so that the delayed first base-band signal is mixed with the second base-band signal 10. Then, the mixer 112 outputs the first demodulation signal 12. By the way, though the first base-band signal 4 is delayed in this example, it is needless to mention that the second base-band signal 10 can be delayed instead of the first base-band signal 4.

FIG. 7 shows another example of the first demodulation circuit 11 of the first embodiment. In FIG. 7, a reference numeral 113 denotes a 90° phase-shift circuit. According to this example, the first base-band signal 4 is inputted into the 90° phase-shift circuit 113 and, in turn, supplied to the mixer 112. On the other hand, the second base-band signal 10 is inputted into the mixer 112 so that the phase-shifted first base-band signal is mixed with the second base-band signal 10. Then, the mixer 112 outputs the first demodulation signal 12. By the way, the same purpose can be attained even if the second base-band signal 10 is phase-shifted instead of the first base-band signal 4.

Figure 8:
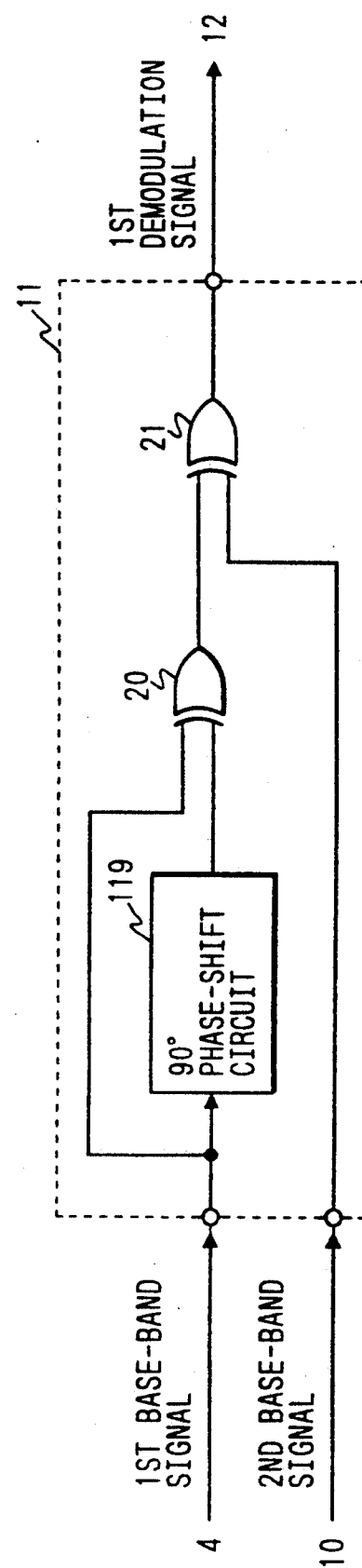
FIG. 8 is a circuit diagram showing still another example of the first demodulation circuit of the FSK data receiving system in accordance with the first embodiment of the present invention.

FIG. 8 shows still another example of the first demodulation circuit 11 of the first embodiment. In FIG. 8, a reference numeral 119 denotes a 90° phase-shift circuit which shifts the phase of the first base-band signal 4. An output of the 90° phase-shift circuit 119 is supplied to a second base-band mixer 20 together with the original first base-band signal 4. An output signal from the second base-band mixer 20 is further supplied to a third base-band mixer 21 to mix with the second base-band signal 10. And, a data decoding is executed based on an output signal from the third base-band mixer 21.

This example is different from the above examples of FIGS. 6 and 7 in that the first base-band signal 4 is transformed into a signal having a frequency twice as large as the first base-band signal 4.

In this example, the second base-band mixer 20 and the third base-band mixer 21 are made by exclusive-OR circuits.

SECOND EMBODIMENT

Hereinafter, a second embodiment of the present invention is explained with reference to drawings.

Figure 9:
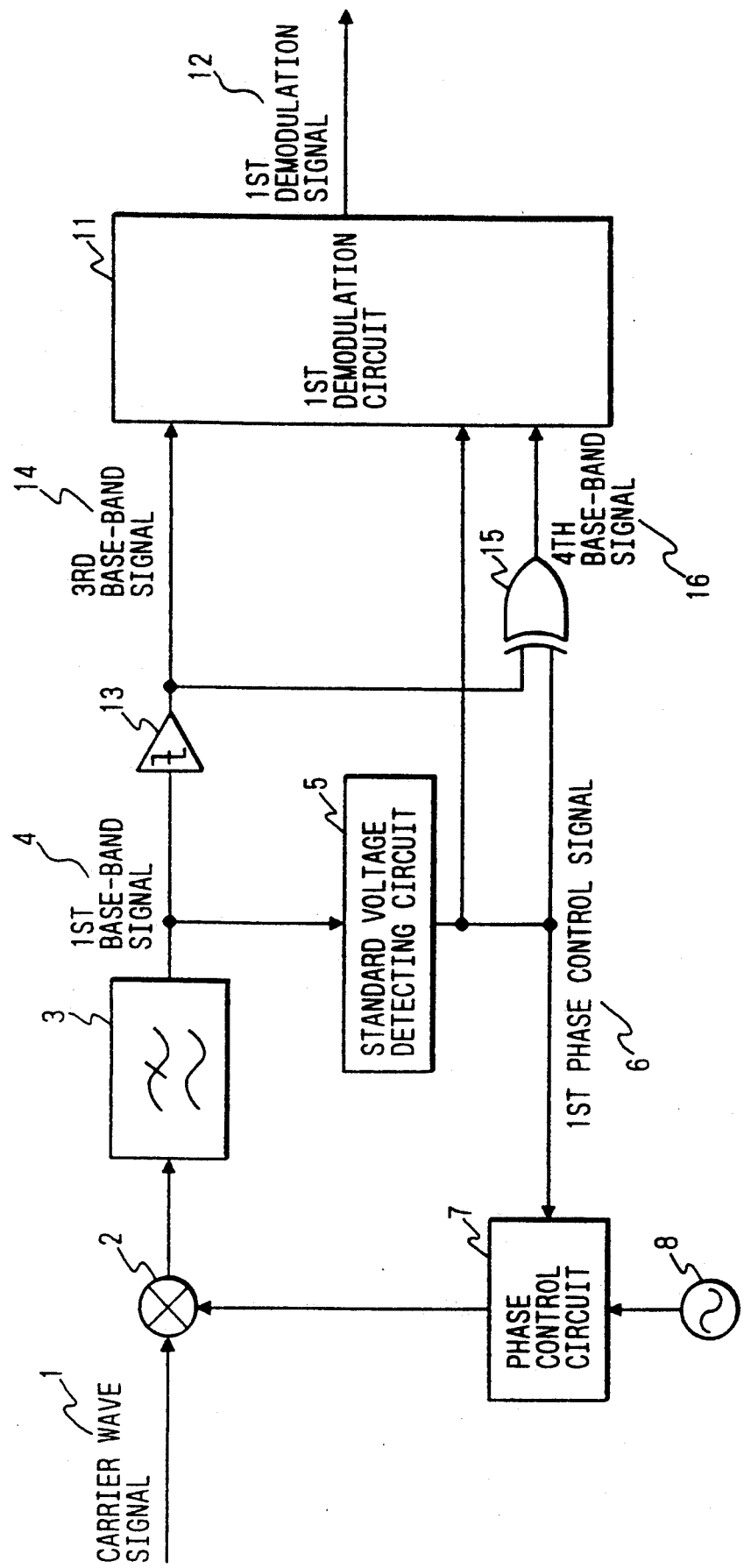
FIG. 9 is a circuit block diagram showing an FSK data receiving system in accordance with a second embodiment of the present invention.

FIG. 9 is a block diagram of an FSK data receiving system in accordance with a second embodiment of the present invention.

In FIG. 9, a reference numeral 13 denotes a limiter amplifier which inputs the first base-band signal 4 and outputs a third base-band signal 14. A reference numeral 15 denotes an exclusive-OR circuit which inputs the third base-band signal 14 and the first phase control signal 6 and outputs a fourth base-band signal 16. A reference numeral 11 denotes a first demodulation circuit which inputs the first phase control signal 6, the third base-band signal 14, and the fourth base-band signal 16.

Figure 10:
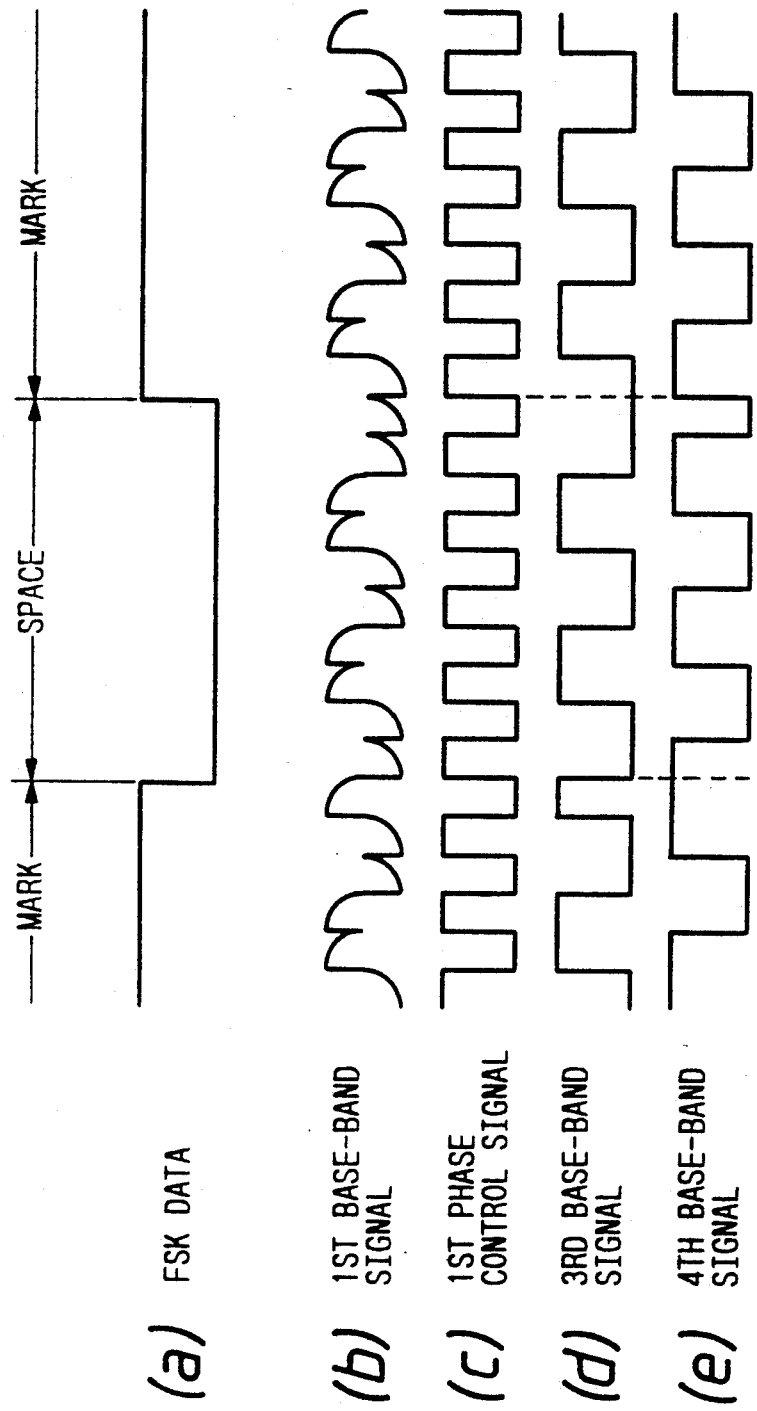
FIGS. 10(a)~10(e) are signal waveforms of main portions showing an operation of the FSK data receiving system in accordance with the second embodiment of the present invention.

FIG. 10 shows waveforms of various portions of the FSK data receiving system in accordance with the second embodiment. This second embodiment is different from the first embodiment in that the mixing of the base-band signal and the first phase control signal 6 in carried out by obtaining an exclusive-OR result based on digital signals instead of analogue signals.

With reference to signal waveforms of FIG. 10, an operation of the FSK-modulated data receiving system constituted above is explained hereinafter.

First of all, as well as the first embodiment, a carrier wave signal 1 which is FSK-demodulated in accordance with the transmission data signal (FIG. 10(a)) is transformed into the first base-band signal 4 (FIG. 10(b)) through the mixer 2 and the low-pass filter 3. At the zero-crossing point of the first base-band signal 4, the phase of the local oscillator signal is switched.

The first base-band signal 4 is suppressed its amplitude in the limiter amplifier 13 and outputted as the third base-band signal 14 (FIG. 10(d)). This third base-band signal 14 and the first phase control signal 6 (FIG. 10(c)) outputted from the standard voltage detecting circuit 5 are mixed in the exclusive-OR circuit 15 so as to output the fourth base-band signal 16 (FIG. 10 (e)).

As well as the first embodiment, the third base-band signal 14 and the fourth base-band signal 16 have a mutual relationship of an advanced phase or a delayed phase with each other in accordance with the FSK-modulated data. Therefore, in this case, the demodulating operation can be realized by causing a 90° delay or a 90° phase-shift in the first demodulation circuit 11.

Figure 11:
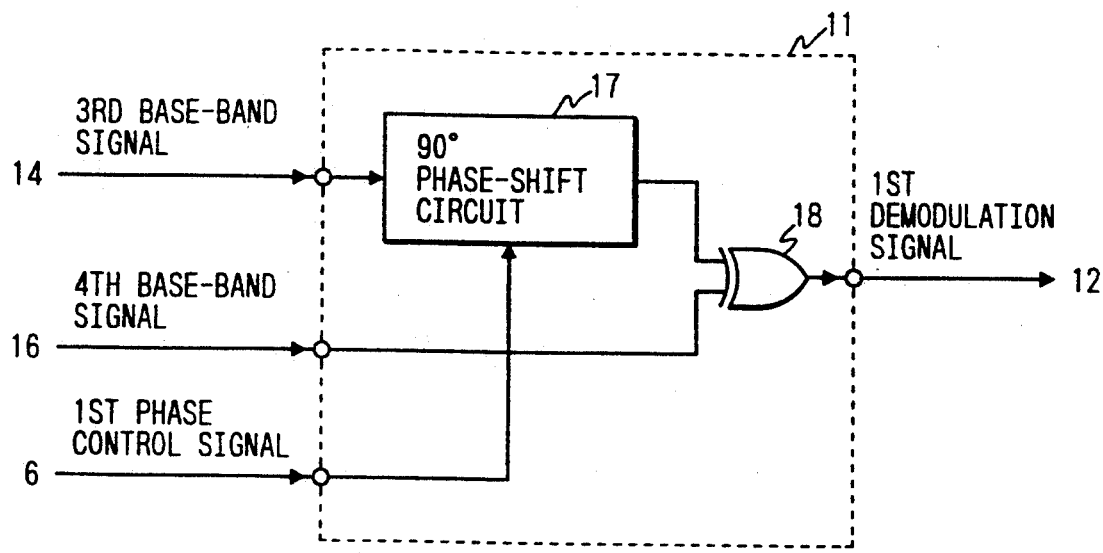
FIG. 11 is a circuit diagram showing one example of a first demodulation circuit of the FSK data receiving system in accordance with the second embodiment of the present invention.

FIG. 11 shows a circuit constitution of a first demodulation circuit 11 serving as a main portion of the FSK data receiving system of this embodiment.

A reference numeral 17 denotes a 90° phase-shift circuit which causes a 90° phase-shift to the third base-band signal 14. An output from the 90° phase-shift circuit 17 and the fourth base-band signal 16 are inputted into the exclusive-OR circuit 18 to obtain an exclusive-OR result. The 90° phase-shift circuit 17 can be easily realized by use of a shift register circuit inputting the first phase control signal 6 as its clock signal.

The output signal from the 90° phase-shift circuit 17 and the fourth base-band signal become mutually in-phase or opposite-phase in accordance with the sign of the FSK-modulated data. Therefore, by obtaining an exclusive-OR result of these signals, a sign judgement can be easily realized. In this manner, by waveform-shaping the base-band signal so as to digitize it, the 90° phase-shift can be easily realized.

Moreover, in this embodiment, though the third base-band signal 14 is phase-shifted by an amount of 90 degree, it is needless to mention that the fourth base-band signal 16 can be phase-shifted by an amount of 90 degrees instead of the third base-band signal 14.

Figure 12:
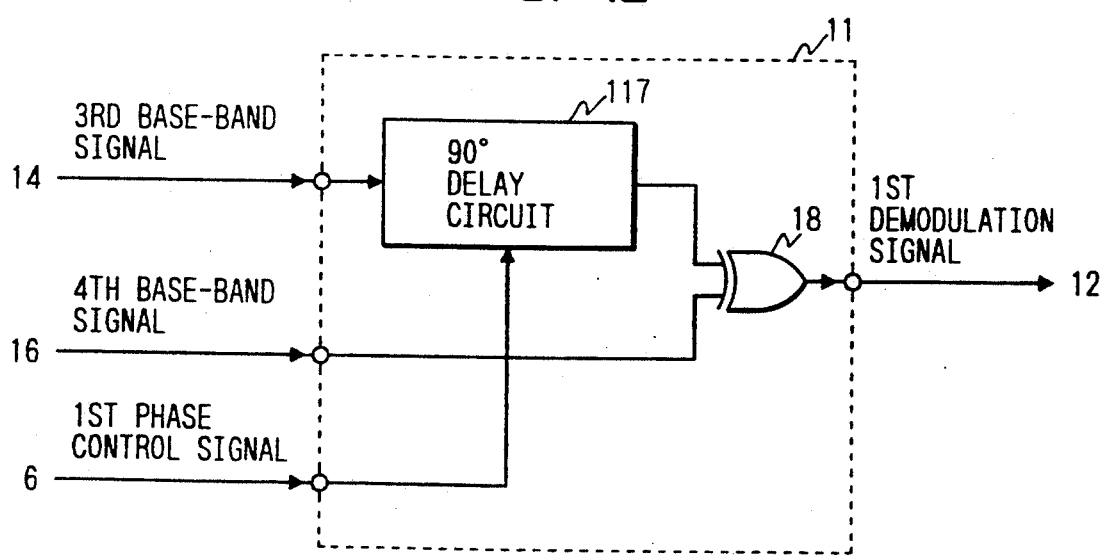
FIG. 12 is a circuit diagram showing another example of the first demodulation circuit of the FSK data receiving system in accordance with the second embodiment of the present invention.

FIG. 12 shows a circuit constitution of another example of a first demodulation circuit 11 of this embodiment.

A reference numeral 117 denotes a 90° delay circuit which delays the third base-band signal 14 by an amount of 90 degrees. An output from the 90° delay circuit 117 and the fourth base-band signal 16 are inputted into the exclusive-OR circuit 18 to obtain an exclusive-OR result.

The output signal from the 90° delay circuit 117 and the fourth base-band signal 16 become mutually in-phase or opposite-phase in accordance with the sign of the FSK-modulated data. Therefore, by obtaining an exclusive-OR result of these signals, a sign judgement can be easily realized as well as the above example of FIG. 11. Furthermore, in the same manner as the above example, the fourth base-band signal 16 can be delayed by an amount of 90 degrees instead of the third base-band signal 14.

Figure 13:
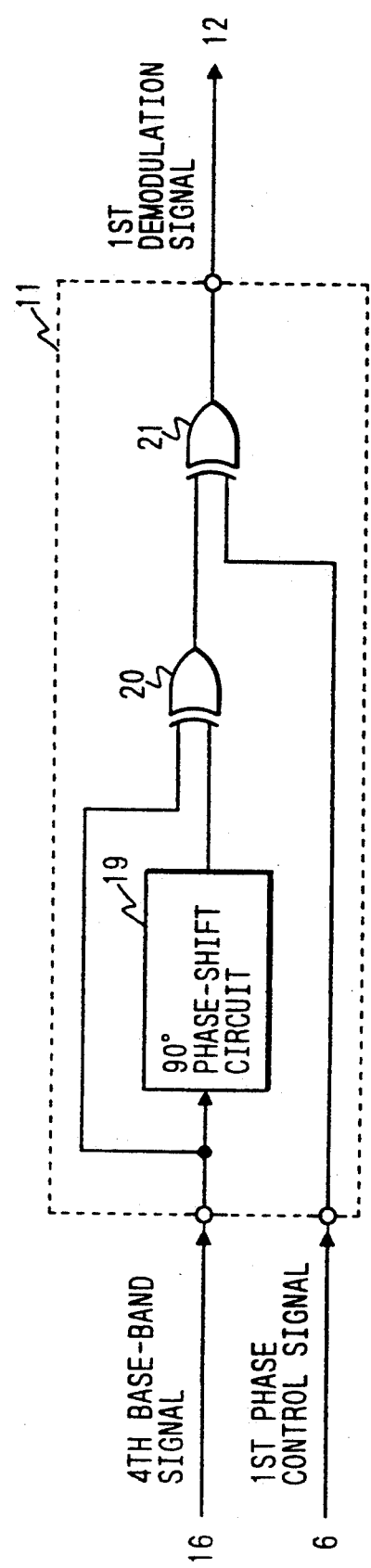
FIG. 13 is a circuit diagram showing still another example of the first demodulation circuit of the FSK data receiving system in accordance with the second embodiment of the present invention.

FIG. 13 shows still another example of the first demodulation circuit 11 of the second embodiment.

In FIG. 13, a reference numeral 19 denotes a 90° phase-shift circuit which causes a 90° phase-shift to the fourth base-band signal 16. An output of the 90° phase-shift circuit 19 is supplied to a second base-band mixer 20 together with the original fourth base-band signal 16. An output signal of the second base-band mixer 20 is further supplied to a third base-band mixer 21 to mix with the first phase control signal 6. This example is different from above examples of FIGS. 11 and 12 in that the fourth base-band signal 16 is transformed into a signal having a frequency twice as large as the fourth base-band signal 16.

In this embodiment, the second base-band mixer 20 and the third base-band mixer 21 are made by exclusive-OR circuits.

An operation of the first demodulation circuit 11 described above is explained hereinafter. By phase-shifting the fourth base-band signal 16 by an amount of 90 degrees in the 90° phase-shift circuit 19 and obtaining an exclusive-OR result of thus phase-shifted signal and the original signal, the output signal from the second base-band mixer 20 becomes twice as large as the fourth base-band signal 16.

Furthermore, this signal has an in-phase or an opposite-phase relationship with respect to the first phase control signal 6 whose relationship depends on the value of the FSK-modulated data. Therefore, by mixing the output signal from the second base-band mixer 20 with the first phase control signal 6 in the third base-band mixer 21, a demodulation can be realized. That is, a data decoding is carried out by utilizing the output signal of the third base-band mixer means.

There was proposed such a conventional demodulation method that, in a conventional quadrature demodulation system, either of I/Q signals is mixed with its phase-shifted signal by 90 degrees to produce a signal having a frequency twice as large as the original signal, and carries out a demodulation by combining thus obtained signal with a signal combining the other I/Q signals.

However, in accordance with the present embodiment, not only a signal equivalent to the I/Q signals can be produced by one mixer but the same signal as the signal combining the I/Q signals can be obtained by use of the first phase control signal 6. Hence, the circuit constitution can be simplified compared with the conventional system.

THIRD EMBODIMENT

Hereinafter, a third embodiment of the present invention is explained with reference to the drawings.

Figure 14:
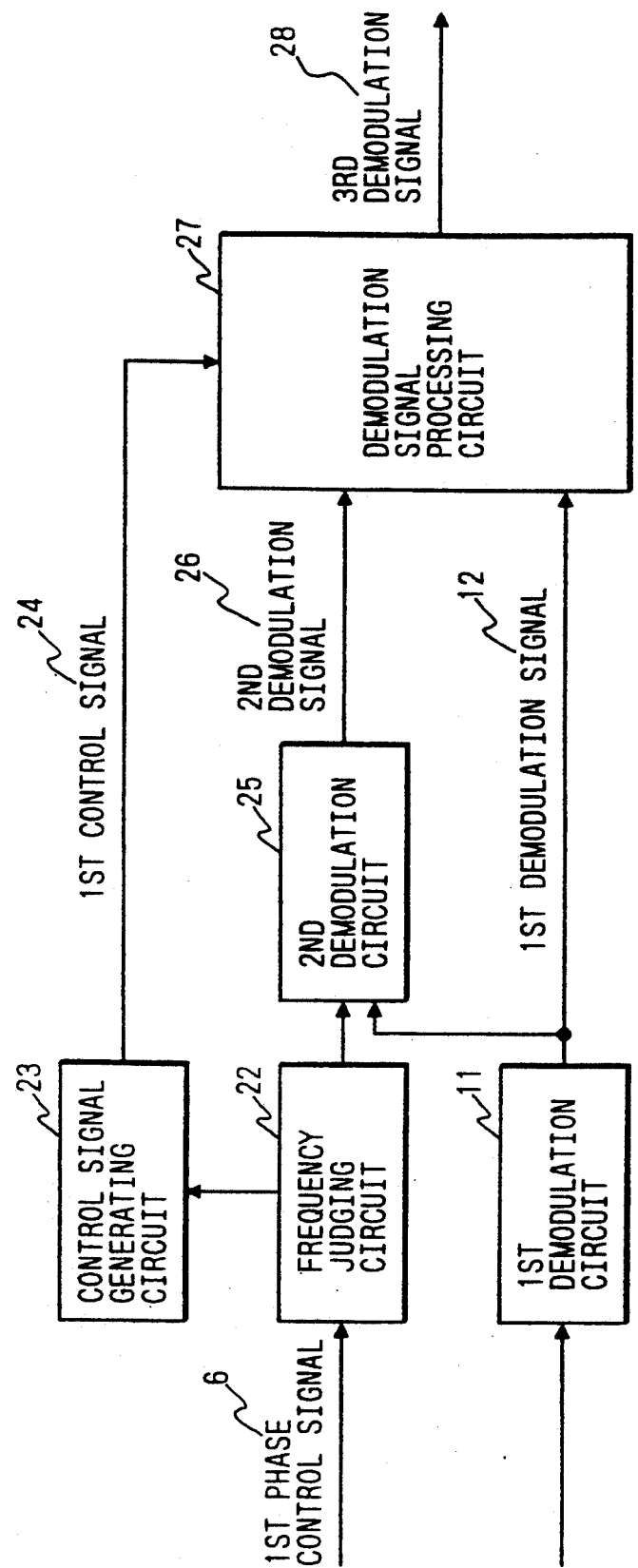
FIG. 14 is a circuit block diagram showing an FSK data receiving system in accordance with a third embodiment of the present invention.

In FIG. 14, a reference numeral 11 denotes a first demodulation circuit which outputs a first demodulation signal 12, and a reference numeral 22 denotes a frequency judging circuit which inputs the first phase control signal 6 and supplies its output to a control signal generating circuit 23. The first phase control signal 6 is produced by the circuits of the first or second embodiment shown in FIG. 1 or 9. The control signal generating circuit 23 outputs a first control signal 24. A reference numeral 25 denotes a second demodulation circuit which inputs an output signal from the frequency judging circuit 22 and the first demodulation signal 12 and outputs a second demodulation signal 26. A reference numeral 27 denotes a demodulation signal processing circuit which inputs the first control signal 24, the second demodulation signal 26, and the first demodulation signal 12 and outputs a third demodulation signal 28.

An operation of thus constituted FSK data receiving system is explained as follows. In the case where the carrier wave signal frequency and the local oscillator signal frequency are offset with each other, the base-band signal becomes high or low in accordance with the FSK-modulated data. That is, a condition where a modulation index is equivalently high or low appears.

In the first demodulation circuit 11 of the second embodiment, a reliability of the demodulation signal is lowered when the equivalent demodulation index is low. Since the first phase control signal 6 has twice as large frequency as the base-band signal, its frequency can be detected by inputting it in the frequency judging circuit 22.

In response to an output signal from the frequency judging circuit 22, the control signal generating circuit 23 judges an offset amount of the local oscillator frequency to produce the first control signal 24.

In response to the first control signal 24, in the case where the offset amount of the local oscillator frequency is small, the demodulation signal processing circuit 27 outputs the third demodulation signal 28 by giving priority to the first demodulation signal 12 which reflects a result of making a judgement of whether the FSK-modulated frequency signal has a positive frequency deviation or a negative frequency deviation in the first demodulation circuit 11.

Furthermore, in the case where the offset amount of the local oscillator frequency becomes a significantly large value, a change of a frequency deviation in the FSK-modulated data can be judged on the basis of high/low of the output voltage from the frequency judging circuit 22.

Still further, on the basis of in-phase/opposite-phase relationship between the output signal of the frequency judging circuit 22 and the first demodulation signal 12, an offset direction of the local oscillator signal can be judged. Namely, the frequency offset direction of the local oscillator signal can be detected by the second demodulation circuit 25, and therefore the second demodulation signal 26 is obtained by inverting or not inverting the output signal from the frequency judging circuit 22 in accordance with the offset direction of the local oscillator signal frequency. Then, the demodulation signal processing circuit 27 produces the third demodulation signal 28 from the first demodulation signal 12 and the second demodulation signal 26. The third demodulation signal 28 is utilized to execute a data decoding.

By the way, though there has been proposed a demodulation method in which, the demodulation is carried out by using the frequency judging circuit on the basis of the fact that the base-band signal frequency is increased or lowered in the case where the local oscillator signal is offset. However, in accordance with the present invention, instead of judging the frequency of the base-band signal, the frequency judgement is executed by use of the first phase control signal 9 which has a frequency twice as large as the base-band signal. Consequently, a pulse counter and the like can be used for the frequency judgement.

FOURTH EMBODIMENT

Next, a fourth embodiment of the present invention is explained with reference to the drawings.

Figure 15:
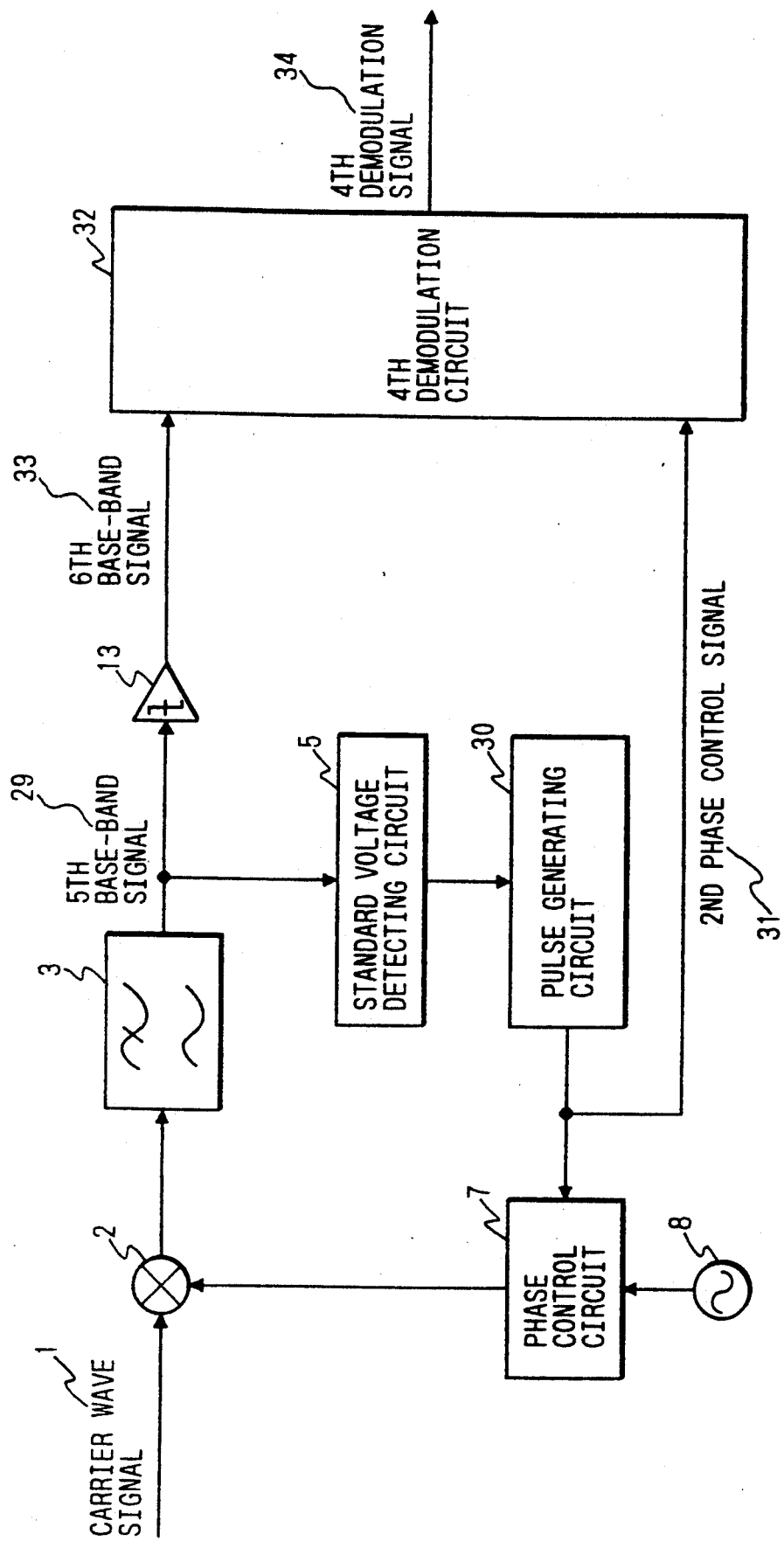
FIG. 15 is a circuit block diagram showing an FSK data receiving system in accordance with a fourth embodiment of the present invention.

FIG. 15 is a block circuit diagram of an FSK data receiving system in accordance with a fourth embodiment of the present invention.

In FIG. 15, an FSK-modulated carrier wave signal 1 is transformed into a fifth base-band signal 29 through a mixer 2 and a low-pass filter 3. This fifth base-band signal 29 is inputted into a standard voltage detecting circuit 5 whose output signal is supplied to a pulse generating circuit 30. An output signal of the pulse generating circuit 30 serves as a second phase control signal 31 which is supplied to both a phase control circuit 7 and a fourth demodulation circuit 32.

On the other hand, the fifth base-band signal 29 is supplied to a limited amplifier 13 whose output is a sixth base-band signal 33. This sixth base-band signal 33 is fed to a fourth demodulation circuit 32 and the fourth demodulation circuit 32 outputs a fourth demodulation signal 34.

Some components of this embodiment have the same constitutions as those disclosed in the first and the second embodiments. Namely, for example, the standard voltage detecting circuit 5 has the same constitution as the circuit already explained in detail with reference to FIG. 3. And also, the phase control circuit 7 is the same as the circuit already explained in detail with reference to FIGS. 4 and 5.

This embodiment is different from the first and the second embodiments in that a predetermined width pulse is generated at a zero-crossing point of the base-band signal and a phase switching operation of the local oscillator signal is restricted to be carried out during the period corresponding to the predetermined pulse width.

An operation of thus constituted FSK data receiving system is explained with reference to waveforms of various portions shown in FIG. 16.

Figure 16:
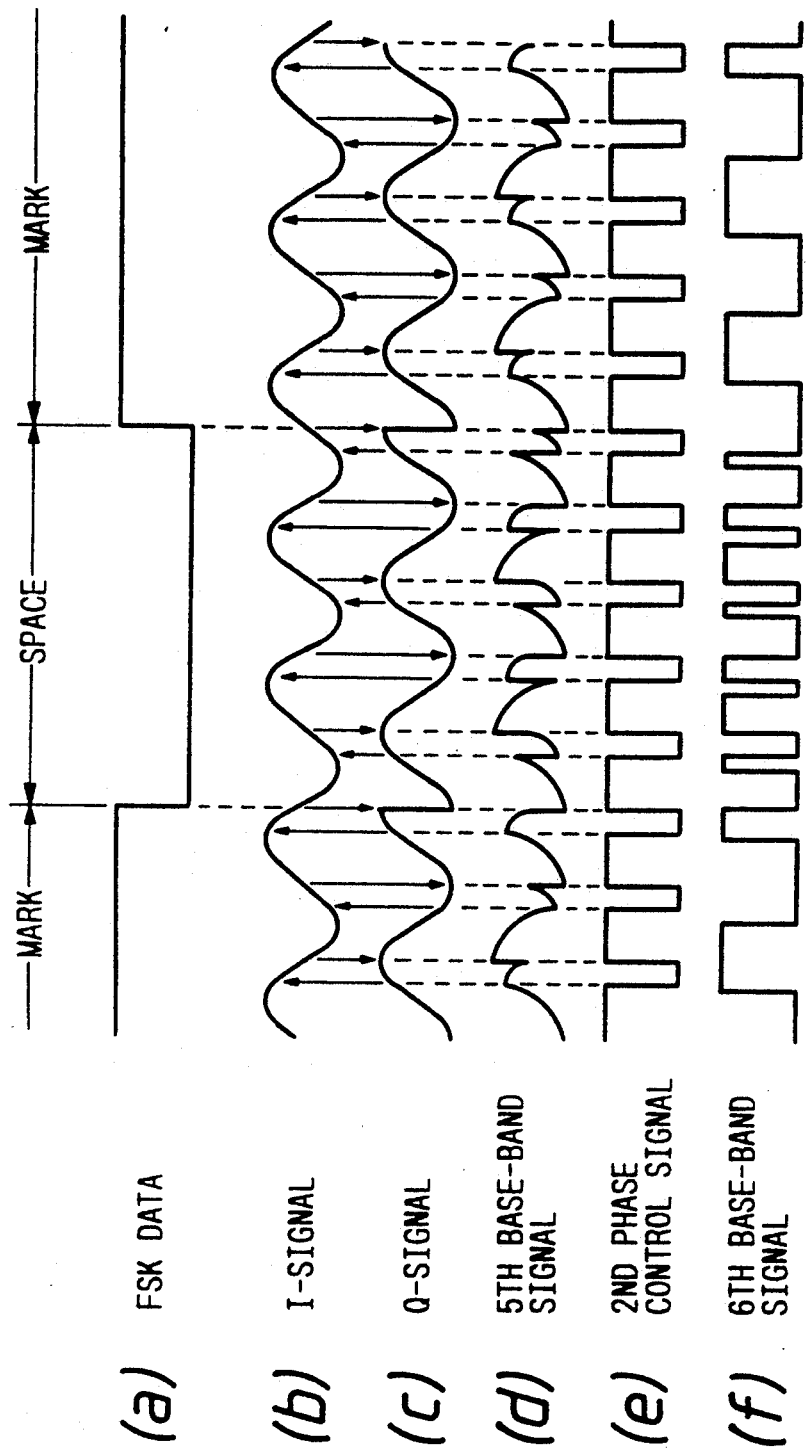
FIGS. 16(a)~16(f) are signal waveforms of main portions showing an operation of the FSK data receiving system in accordance with a fourth embodiment of the present invention.

First of all, the carrier wave signal 1 which is FSK-modulated in accordance with the transmission data signal (FIG. 16 (a)) is transformed into the fifth base-band signal 29 (FIG. 16 (d)) in the mixer 2. At the zero-crossing point of the fifth base-band signal 29, the second phase control signal 31 (FIG. 16(e)) is generated from the pulse generating circuit 30. The phase of the local oscillator signal is changed over during the pulse width of this second phase control signal 31.

On the other hand, the fifth base-band signal 29 is shaped its waveform into a rectangular waveform in the limiter amplifier 13 to produce the sixth base-band signal 33 (FIG. 16(f)).

I-signal and Q-signal shown in FIGS. 16(b) and 16(c) are signals used in a conventional quadrature demodulation. And, the fifth base-band signal 29 is produced by switching the I/Q signals in response to the second phase control signal 31.

In the case where the FSK-modulated data is "mark", the sign of the sixth base-band signal 33 is not changed before and after the pulse of the second phase control signal 31 builds up. To the contrary, in the case where the FSK-modulated data is "space", the sign of the sixth base-band signal 33 becomes opposite after the pulse of the second phase control signal 31 builds up. In this manner, the demodulation can be executed by judging whether or not the sign of the sixth base-band signal 33 is changed before and after the building-up edge of the second phase control signal 31.

Figure 17:
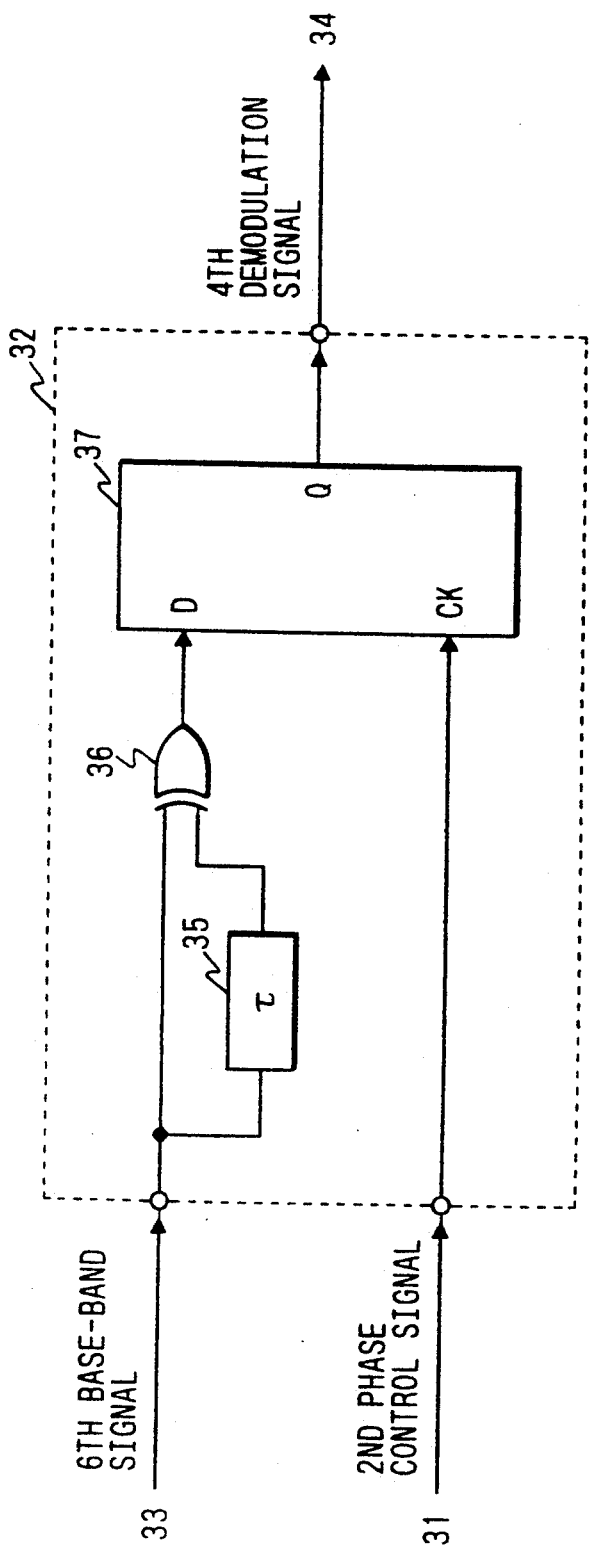
FIG. 17 is a circuit diagram showing a fourth demodulation circuit constituting a main portion of the FSK data receiving system in accordance with the fourth embodiment of the present invention.

FIG. 17 shows a circuit constitution of the fourth demodulation circuit 32 serving as an essential part of the FSK-modulated data receiving system in accordance with this embodiment of the present invention.

In FIG. 17, a reference numeral 35 denotes a delay circuit for delaying the sixth base-band signal 33, and a reference numeral 36 denotes an exclusive-OR circuit for mixing the sixth base-band signal 33 and an output signal from the delay circuit 35. A reference numeral 37 denotes a D-type flip-flop which inputs an output from the exclusive-OR circuit 36 and the second phase control signal 31.

The exclusive-OR circuit 36 outputs "1" when the sign is reversed within a delay time $\tau$ and otherwise outputs "0". The demodulation can be realized by inputting the second phase control signal 31 to a clock terminal of the D-type flip-flop 37 and further by judging whether or not the sign of the sixth base-band signal 33 is the same before and after the building-up edge of the second phase control signal 31.

Though, in this fourth embodiment, the local oscillator signal is changed its phase at the zero-crossing point of the fifth base-band signal 29, it is also desirable to detect a trailing-edge of the sixth base-band signal 33 so as to switch the phase of the local oscillator signal at that timing.

In this case, the demodulation can be executed by use of only the sign of the sixth base-band signal 33 immediately after the phase is changed over. Moreover, it is needless to say that the demodulation can be carried out by use of a building-up edge instead of the trailing-edge of the sixth base-band signal 33.

FIFTH EMBODIMENT

Hereinafter, a fifth embodiment of the present invention is explained with reference to the drawings.

Figure 18:
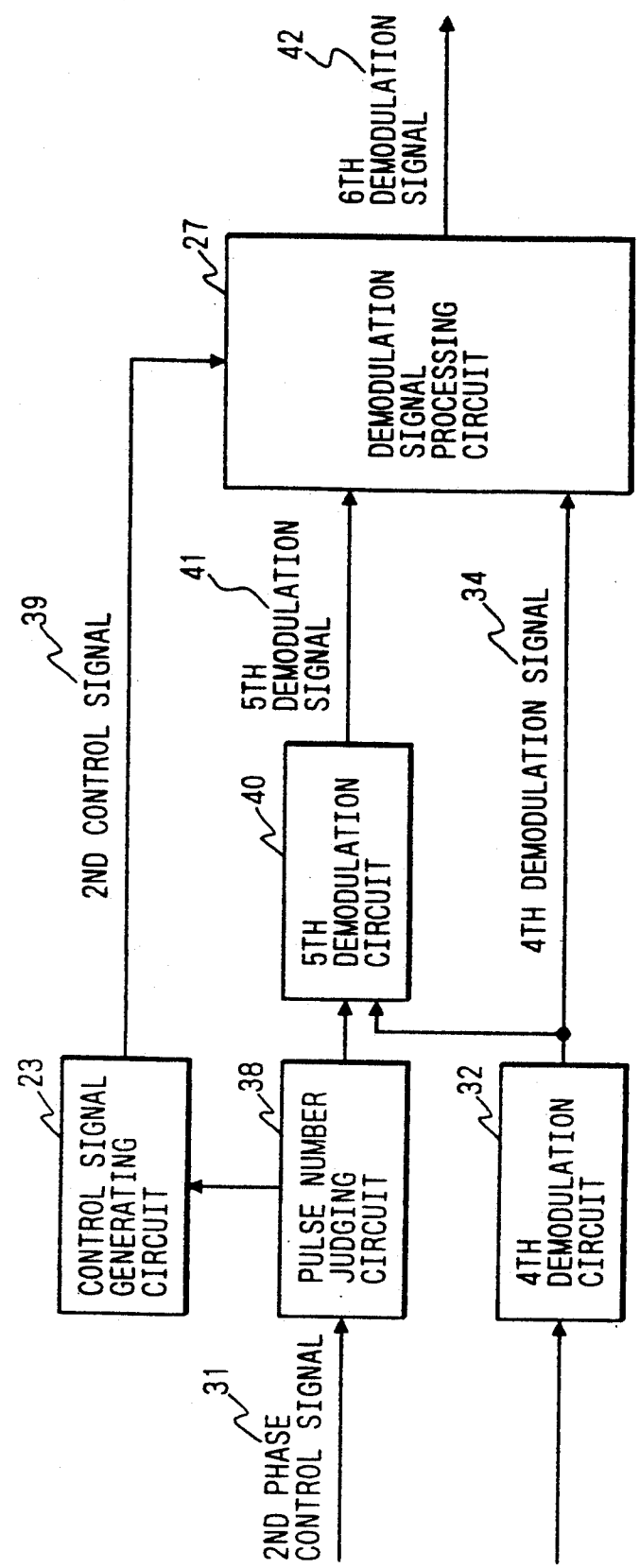
FIG. 18 is a circuit block diagram showing an FSK data receiving system in accordance with a fifth embodiment of the present invention.

FIG. 18 shows a block circuit diagram of an FSK data receiving system in accordance with a sixth embodiment of the present invention.

In FIG. 18, a reference numeral 32 denotes a fourth demodulation circuit which outputs a fourth demodulation signal 34, and a reference numeral 38 denotes a pulse number judging circuit which inputs the second phase control signal 31 and whose output is fed to a control signal generating circuit 23. The control signal generating circuit 23 outputs a second control signal 39. A reference numeral 40 denotes a fifth demodulation circuit which inputs an output signal from the pulse number judging circuit 38 and the fourth demodulation signal 34 and outputs a fifth demodulation signal 41. A reference numeral 27 denotes a demodulation signal processing circuit which inputs the second control signal 39, the fifth demodulation signal 41, and the fourth demodulation signal 34 and outputs a sixth demodulation signal 42.

This embodiment is different from the third embodiment in that the pulse number judging circuit 38 is provided instead of the frequency judging circuit 22 and the fourth demodulation circuit 32 is provided instead of the first demodulation circuit 11, and further the fifth demodulation circuit 40 is provided instead of the second demodulation circuit 25.

In this fifth embodiment, the pulse number judging circuit 38 serves as a judging means of a base-band frequency. That is, a frequency judgement is carried out by counting the pulse number of the second phase control signal 31. The second phase control signal 31 is produced from the circuit of the fourth embodiment shown in FIG. 15.

SIXTH EMBODIMENT

Figure 19:
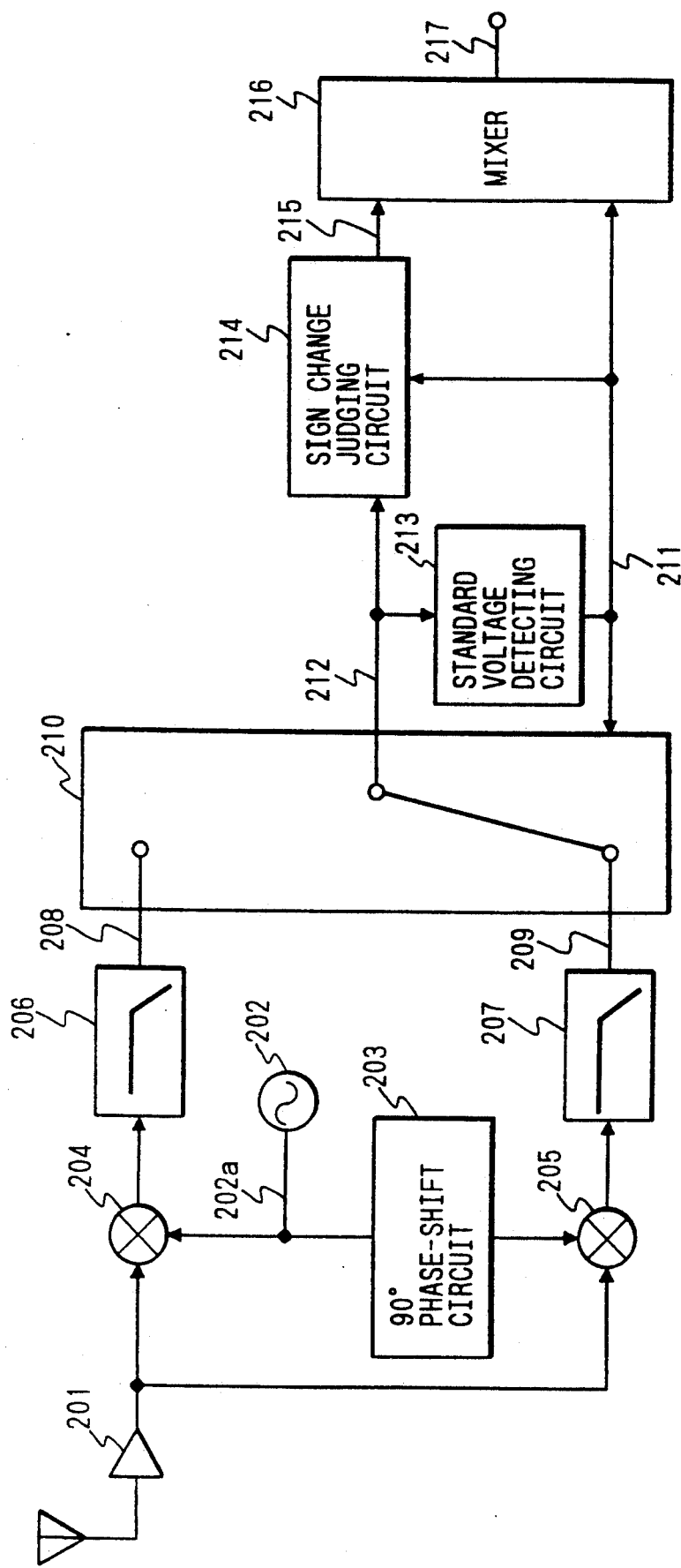
FIG. 19 is a circuit block diagram showing essential components of an FSK data receiving system in accordance with a sixth embodiment of the present invention.

FIG. 19 shows essential components of an FSK data receiving system in accordance with a sixth embodiment of the present invention.

In FIG. 19, a reference numeral 201 denotes an FSK-modulated signal which is received by an antenna and then amplified. A reference numeral 202 denotes a local oscillator which generates a local oscillator signal 202a having the substantially the same frequency as the FSK-modulated signal 201.

A reference numeral 203 denotes a 90° phase-shift circuit which shifts a phase of the local oscillator signal 202a. A reference signal 204 denotes a first mixer which mixes the FSK-modulated signal 201 and the local oscillator signal 202a, and a reference signal 205 denotes a second mixer which mixes the FSK-modulated signal 201 and an output signal from the 90° phase-shift circuit 203.

Reference numeral 206 and 207 denote a first and a second low-pass filters which obtain I-signal 208 and Q-signal 209 from outputs of the first and second mixers 204 and 205, respectively. A reference numeral 210 denotes a signal selecting circuit which selects the I-signal 208 or the Q-signal 209 in accordance with a control signal 211 to produce an output signal 212.

A reference numeral 213 denotes a standard voltage detecting circuit which detects a point where the output signal 212 of the signal selecting circuit 210 crosses a standard voltage. In this embodiment, this standard voltage is set to be 0 V. Therefore, this point is, hereinafter, referred to as a zero-crossing point. The standard voltage detecting circuit 213 outputs a control signal 211.

A reference numeral 214 denotes a sign change judging circuit which judges whether or not a sign of the output signal 212 is changed before and after the change of the control signal 211 and, in turn, generates a sign change judging signal 215. And, a reference numeral 216 denotes a mixer which mixes the control signal 211 and the sign change judging signal 215.

With above arrangement, the FSK-modulated signal 201 and the local oscillator signal 202a are supplied to the first mixer 204. An output from the first mixer 204 is fed to the first low-pass filter 206 to generate the I-signal 208 as a first base-band signal. On the other hand, the local oscillator signal 202a is shifted its phase by 90 degrees in the 90° phase-shift circuit 203. An output from the 90° phase-shift circuit 203 is supplied to the second mixer 205 together with the FSK-modulated signal 201. An output from the second mixer 205 is fed to the second low-pass filter 207 to generate the Q-signal 209 as a second base-band signal.

Next, the I-signal 208 and the Q-signal 209 are supplied to the signal selecting circuit 210. The signal selecting circuit 210 selects I-signal 208 or the Q-signal 209 in accordance with the control signal 211 to produce the output signal 212. This output signal 212 is inputted into the standard voltage detecting circuit 213.

The standard voltage detecting circuit 213 generates the control signal 211 whose sign is inverted every time the standard voltage (OV) of the output signal 212 is detected. Then, the output signal (i.e. selected I/Q signal) 212 and the control signal 211 are supplied to the sign change judging circuit 214. The sign change judging circuit 214 judges whether or not the sign of the signal 212 is changed before and after the change of the control signal 211, and outputs the sign change judging signal 215.

Subsequently, this sign change judging signal 215 and the control signal 211 are supplied to the mixer 216 to obtain the demodulation signal 217.

A detailed signal processing in the above-described circuit is explained with reference to FIGS. 21(a)~21(f).

FIG. 21(a) shows the I-signal 208 and the Q-signal 209, and FIG. 21(b) shows the selected I/Q signal 212. FIG. 21(c) shows the control signal 211, and FIG. 21(d) shows the sign change judging signal 215. FIG. 21(e) shows the demodulation signal 217. FIGS. 21(a)~21(e) respectively show two waveforms corresponding to "mark" and "space" transmitted by the FSK-modulated signal.

As shown in FIG. 21(a), the Q-signal 209 which is obtained in the FSK-direct conversion becomes a signal advanced by 90 degrees than the I-signal 208 in the case where the transmitted data is the "mark". To the contrary, the Q-signal 209 becomes a signal delayed by 90 degrees than the I-signal 208 in the case where the transmitted data is the "space".

A switching operation of the signal selecting circuit 210 is executed at the zero-crossing point of the I-signal 208 or the Q-signal 209. For example, when the I-signal 208 reaches the zero-crossing point, the I/Q signal 212 changes as follows.

Since the Q-signal 209 is advanced from the I-signal 208 by 90 degrees in the case where the transmitted data is the "mark", the sign of the selected I/Q signal 212 is changed when the signal selecting circuit 210 is switched from the I-signal 208 to the Q-signal 209.

On the other hand, the sign of the selected I/Q signal 212 is not changed when the signal selecting circuit 210 is switched from the I-signal 208 to the Q-signal 209 in the case where the transmitted data is the "space", since the Q-signal 209 is delayed from the I-signal 208 by 90 degrees. That is, after the switching operation from the I-signal to the Q-signal, the Q-signal repeats the same waveform corresponding to the I-signal having appeared 90-degree before. In other words, the sign of the I/Q signal 212 does not changed in the switching operation from the I-signal 208 to the Q-signal 209.

Accordingly, by carrying out the switching operation at the zero-crossing point of the I-signal 208 from the I-signal 208 to the Q-signal 209 and further by judging whether or not the sign of the selected I/Q signal 212 is changed, it becomes possible to detect whether or not the Q-signal 209 is advanced or delayed with respect to the I-signal 208.

Furthermore, since the I-signal 208 and the Q-signal 209 are symmetrical, the similar judgement can be realized by carrying out the switching operation at the zero-crossing point of the Q-signal 209 corresponding to a switching point from the Q-signal 209 to the I-signal 208.

Hereupon, since the zero-crossing points of the I-signal 208 and the Q-signal 209 occur alternately, it would be understood that the switching operation can be realized by using the zero-crossing point of the selected I/Q signal 212.

namely, it is now supposed that the signal selecting circuit 210 is switched from the I-signal 208 to the Q-signal 209 at the zero-crossing point of the I/Q signal 212. If the sign of the selected I/Q signal 212 is changed, then this shows that the Q-signal 209 is advanced from the I-signal 208. Thus, the transmitted data is judged to be the "mark". If the sign of the selected I/Q signal 212 is not changed, this shows that the Q-signal 209 is delayed from the I-signal 208. Thus, the transmitted data is judged to be the "space".

On the contrary, it is now supposed that the signal selecting circuit 210 is switched from the Q-signal 209 to I-signal 208 at the zero-crossing point of the I/Q signal 212. If the sign of the selected I/Q signal 212 is changed, this shows that the I-signal 208 is advanced from the Q-signal 209. Thus, the transmitted data is judged to be the "space". If the sign of the selected I/Q signal 212 is not changed, this shows that the I-signal 208 is delayed from the Q-signal 209. Thus, the transmitted data is judged to be the "mark".

The switching operation between the I-signal 208 and the Q-signal 209 is controlled by the control signal 211 (refer to FIG. 21(c)) of the signal selecting circuit 210, and therefore a presently selected signal can be judged from the value of the control signal 211. Consequently, the demodulation (FIG. 21(e)) can be accomplished by making a judgement of whether or not the sign of the signal 212 is changed at before and after the zero-crossing point; i.e. the changing point of the control signal 211 (FIG. 21(d)), and further comparing it with the presently selected signal by the control signal 211.

Hereinafter, the detailed circuit constitutions of the signal selecting circuit 210, the standard voltage detecting circuit 213, the sign change detecting circuit 214, and the mixer 216 are explained.

Figure 22A:
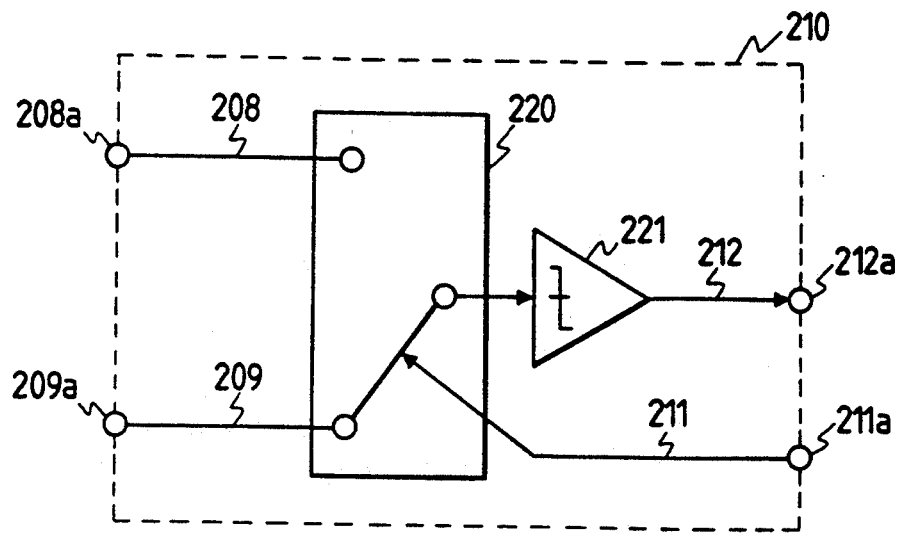
FIGS. 22(a) and 22(b) are circuit diagrams showing examples of a signal selecting circuit in accordance with the sixth and the seventh embodiment.
Figure 22B:
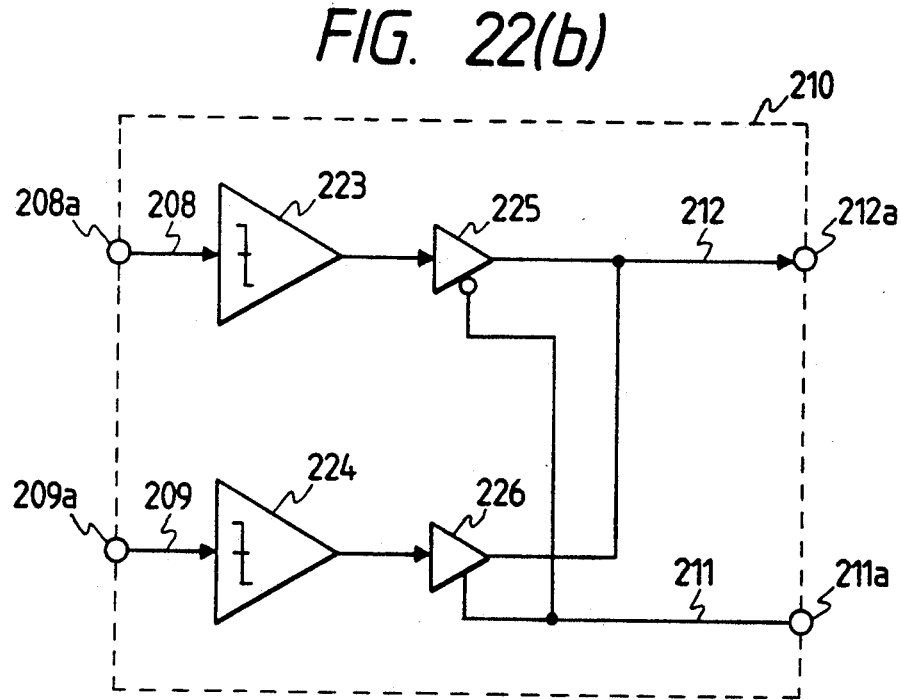

FIGS. 22(a) and 22(b) show examples of the signal selecting circuit 210. As shown in FIGS. 22(a) and 22(b), the signal selecting circuit 210 has a first and a second input terminals 208a and 209a which input the I-signal 208 and the Q-signal 209, a control signal input terminal 211a which inputs the control signal 211, and an output terminal 212a which outputs the selected I/Q signal 212.

In the case where the signal selecting circuit 210 is constituted as shown in FIG. 22(a), the I-signal 208 and the Q-signal 209 are supplied to the input terminals 208a and 209a, respectively. An analogue switch 220 selects either the I-signal 208 or the Q-signal 209 in response to the control signal 211 to obtain the I/Q signal shown by a solid line in FIG. 21(b). If this signal is transformed into a digital signal in the limiter amplifier 221, a dotted line in FIG. 22(b).

The limiter amplifier 220 can be removed if the following signal processing circuit is not constituted by digital circuit elements.

On the other hand, in the case where the signal selecting circuit 210 is constituted as shown in FIG. 22(b), the I-signal 208 and the Q-signal 209 supplied to the input terminals 208a and 209a are transformed into digital signals in limiter amplifiers 223 and 224, respectively. These digital signals are supplied to three-state circuits 225 and 226, respectively. These three-state circuits 225 and 226 are switched to obtain the signal 212 shown by dotted line in FIG. 21(b). That is, when the control signal 211 is "1", the I-signal 208 is selected. On the other hand, when the control signal 211 is "0", the Q-signal 209 is selected.

Next, the standard voltage detecting circuit 213 is explained in detail with reference to FIG. 23. The standard voltage detecting circuit 213 includes an edge detecting circuit 227 which detects the sign change of the input digital signal 212, and a D-type flip-flop 228.

A detecting signal of the edge detecting circuit 227 is inputted into the D-type flip-flop 228 as a clock input. And, its inverted output is added to a data input terminal so that the state of its output can be changed in response to every clock input.

The zero-crossing points shown by the dotted line of FIG. 21(b) are detected by the edge detecting circuit 227, and the pulse output is obtained as shown in FIG. 21(d).

The edge detecting circuit 227 functions to change the sign of the output signal in response to the edge of the input signal.

Figure 23:
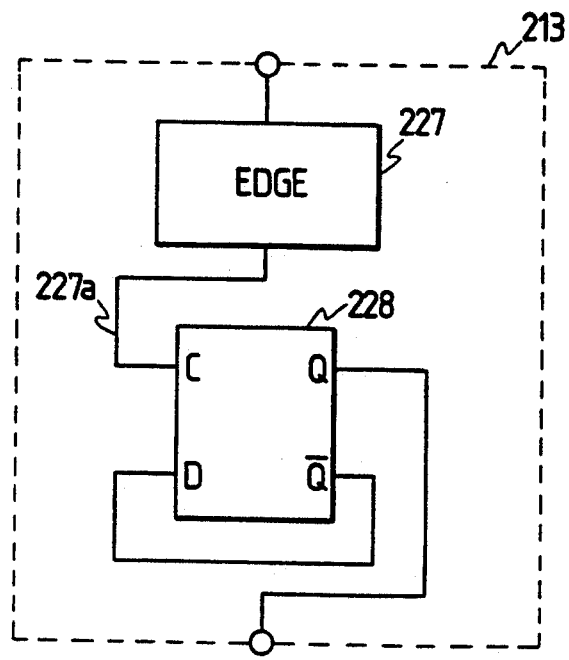
FIG. 23 is a circuit diagram showing a standard voltage detecting circuit in accordance with the sixth and the seventh embodiment.
Figure 24A:
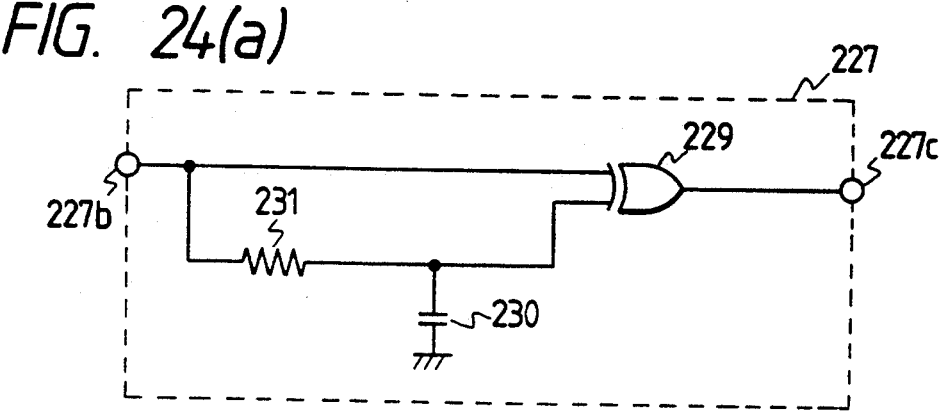
FIGS. 24(a) and 24(b) are circuit diagrams showing examples of an edge detecting circuit in accordance with the sixth and the seventh embodiment.

FIG. 24(a) shows one example of the edge detecting circuit 227 shown in FIG. 23. A reference numeral 229 denotes an exclusive-OR circuit having two input terminals. One input terminal of the exclusive-OR circuit 229 is connected to one end of a capacitance 230 serving as a reference value for comparing voltages. The other end of the capacitance 230 is grounded.

Furthermore, the other input terminal of the exclusive-OR circuit 229 is directly connected to an input terminal 227b of the edge detecting circuit 227. And, a resistance 231 is provided to connect the input terminal 227b and the one end of the capacitance 230. An output terminal of the exclusive-OR circuit 229 is connected to an output terminal 227c of the edge detecting circuit 227.

It is now supposed that the input signal to the edge detecting circuit 227 is "1" and the same voltages are supplied to both input terminals of the exclusive-OR circuit 229. Under such a condition, if the input signal has changed from "1" to "0", the voltage of the one input terminal of the exclusive-OR circuit 229 becomes "0" instantaneously.

The voltage of the other input terminal remains "1" during a time T relating to a time constance determined by the resistance 231 and the capacitance 230. Therefore, a pulse signal having a time width T is obtained as the output signal 227a of the edge detecting circuit 227.

In the same manner, in the case where the input signal has changed from "1" to "0", a pulse signal having a time width T is obtained. Accordingly, if this time T is determined to be a sufficiently small value compared with the period of the base-band signal, the output signal 232 of the edge detecting circuit becomes a judging signal for discriminating the zero-crossing point of the base-band signal.

Figure 24B:
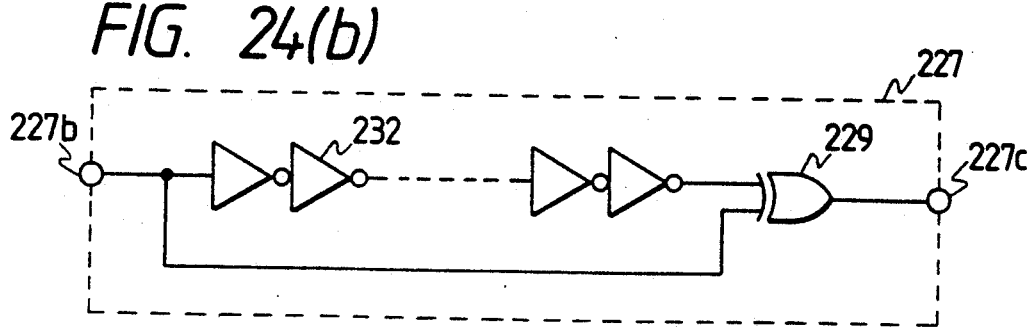

FIG. 24(b) shows another example of the edge detecting circuit 227. An input terminal 227b of the edge detecting circuit 227 is on one hand connected to one input terminal of an exclusive-OR circuit 229 through a serially connected even number of NOT circuits 232 to generate a signal delayed by the time period T, and is on the other hand directly connected to the other input terminal of the exclusive-OR circuit 229. An output terminal 229 is connected to an output terminal 227c of the edge detecting circuit 227. This constitution is advantageous in that the circuit can be made small since no capacitance element is not included.

The D-type flip-flop 228 is used to invert the control signal 211 of the signal selecting circuit 210 at the zero-crossing points. That is, by inputting the output signal 227a as the clock signal, an inverted signal is read in so as to invert the output signal. With this arrangement, the circuit for inverting the output signal at every zero-crossing point can be constituted. Thus, by inputting the selected I/Q signal 212, the control signal 211 can be obtained as shown in FIG. 21(c).

The sign change judging circuit 214 functions to detect the zero-crossing point of the base band signal in accordance with the changing point of the control signal 211 (FIG. 21(c) and judge whether or not the sign of the signal 212 changes before and after the zero-crossing point (FIG. 21(b)) so as to output a judging signal of "1" when the signal changes as shown in FIG. 21(d) and otherwise output a judging signal of "0".

Figure 25:
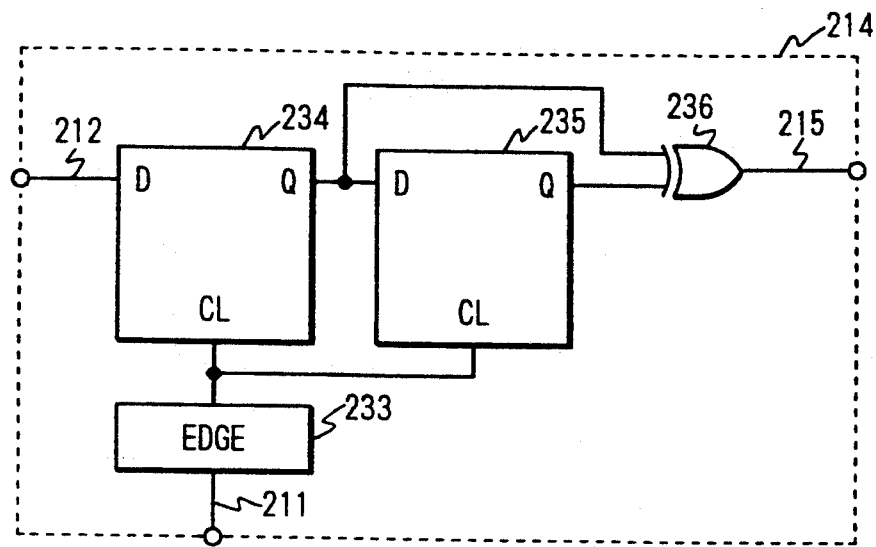
FIG. 25 is a circuit diagram showing a sign change judging circuit in accordance with the sixth and the seventh embodiment.

FIG. 25 shows a detailed constitution of the sign change judging circuit 214. The control signal 211 is inputted into an edge detecting circuit 233. The constitution of the edge detecting circuit is the same as the circuit shown in FIGS. 24(a) or 24(b). An output signal from the edge detecting circuit 233 is supplied to clock terminals of D-type flip-flops 234 and 235. The I/Q signal 212 is inputted into a data terminal of the D-type flip-flop 234. An output of the D-type flip-flop 234 is supplied to a data terminal of the D-type flip-flop 235.

And, both outputs of the D-type flip-flops 234 and 235 are inputted to an exclusive-OR circuit 236. When the signs of the D-type flip-flops 234 and 235 are different with each other, the exclusive-OR circuit 236 outputs "1" and otherwise outputs "0".

Figure 26A:
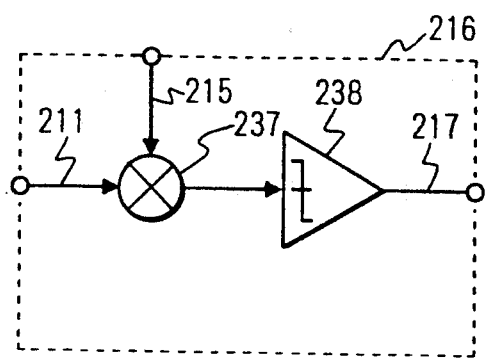
FIGS. 26(a) and 26(b) are circuit diagrams showing examples of a mixer in accordance with the sixth and the seventh embodiment.

FIG. 26(a) shows one example of the mixer 216. In FIG. 26(a), a reference numeral 237 denotes a mixer and a reference numeral 238 denotes a limiter amplifier. The sign change judging signal 215 and the control signal 211 are mixed in the mixer 237. An output signal of the mixer 237 is supplied to the limiter amplifier 238 to produce the rectangular demodulation signal 217.

Figure 26B:
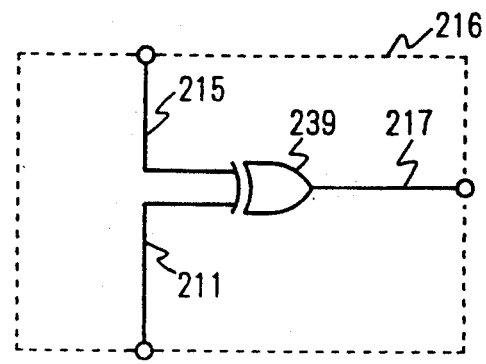

FIG. 26(b) shows another example of the mixer 216, which is constituted by an exclusive-OR circuit 239. That is, the sign change judging signal 215 and the control signal 211 are supplied to the exclusive-OR circuit 239, and the demodulation signal 217 is produced as an output from the exclusive-OR circuit 239.

In accordance with the demodulation apparatus of this embodiment, by virtue of the switching operation at the zero-crossing points of the I/Q signal, an amplitude of the demodulated base-band signal 212 becomes large and therefore a large noise margin can be obtained.

SEVENTH EMBODIMENT

Hereinafter, a seventh embodiment of the present invention is explained in detail with reference to FIG. 20.

Figure 20:
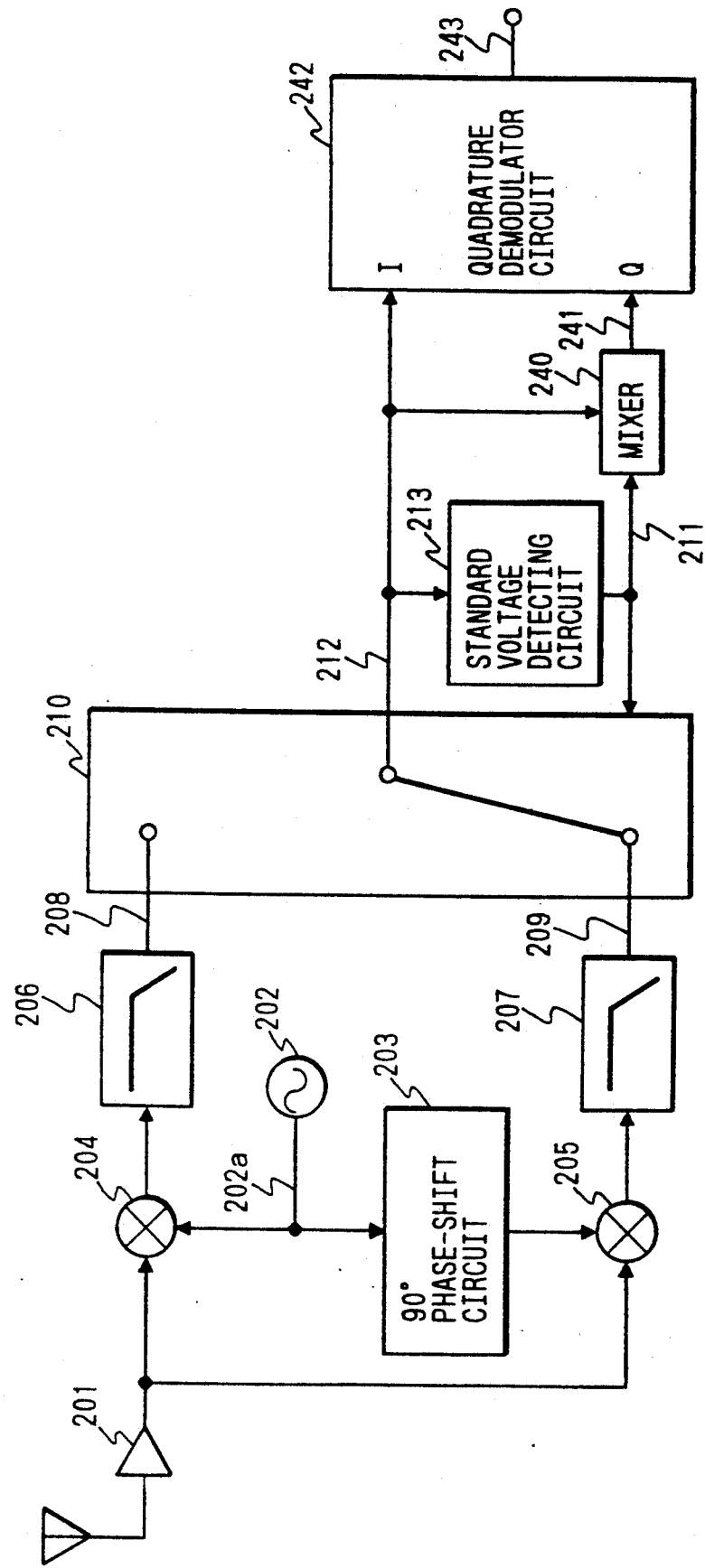
FIG. 20 is a circuit block diagram showing essential components of an FSK data receiving system in accordance with a seventh embodiment of the present invention.

FIG. 20 shows essential components of the FSK data demodulation system in accordance with the present invention. Furthermore, FIG. 21(f) shows a signal waveform obtained in the demodulation process of the demodulation system shown in FIG. 20.

In FIG. 20, a reference numeral 201 denotes an FSK-modulated signal which is received by an antenna and then amplified. A reference numeral 202 denotes a local oscillator which generates a local oscillator signal 202a having the substantially the same frequency as the FSK-modulated signal 201.

A reference numeral 203 denotes a 90° phase-shift circuit which shifts a phase of the local oscillator signal 202a. A reference signal 204 denotes a first mixer which mixes the FSK-modulated signal 201 and the local oscillator signal 202a, and a reference signal 205 denotes a second mixer which mixes the FSK-modulated signal 201 and an output signal from the 90° phase-shift circuit 203.

Reference numerals 206 and 207 denote a first and a second low-pass filters which obtain I-signal 208 and Q-signal 209 from outputs of the first and second mixers 204 and 205, respectively. A reference numeral 210 denotes a signal selecting circuit which selects the I-signal 208 or the Q-signal 209 in accordance with a control signal 211 to produce an output signal 212.

A reference numeral 213 denotes a standard voltage detecting circuit which detects a point where the output signal 212 of the signal selecting circuit 210 crosses a standard voltage. In this embodiment, this standard voltage is set to be 0 V; i.e. the zero-crossing point. The standard voltage detecting circuit 213 outputs a control signal 211.

A reference numeral 240 denotes a mixer which mixes the output signal 212 of the signal selecting circuit 210 and the control signal 211 to generate an output signal 241. And, a reference numeral 242 denotes a quadrature demodulation circuit which inputs the output signal 212 of the signal selecting circuit 210 and the output signal 241 of the mixer 240 to execute a quadrature demodulation.

In this embodiment, the signal selecting circuit 210 has the constitution shown in FIGS. 22(a) or 22(b). The standard voltage detecting circuit 213 has the constitution shown in FIGS. 23, and 24(a) or 24(b). And, the mixer 240 has the same constitution as the mixer shown in FIGS. 26(a) or 26(b).

An operation of this embodiment is explained with reference to FIG. 21.

First of all, the I-signal 208 and the Q-signal 209 are alternately selected in the signal selecting circuit 210 on the basis of the control signal 211 obtained by detecting the signal 212 in the standard voltage detecting circuit 213, so as to generate the base-band signal whose waveform is shown by the dotted line of FIG. 21(b).

Then, by combining this base-band signal 212 with the control signal 211, a signal whose waveform is shown in FIG. 21(f) is obtained. In the case where the transmitted data is "mark", the waveform of FIG. 21(b) is delayed than the waveform of FIG. 21(f) by 90 degrees. On the contrary, in the case where the transmitted data is "space", the waveform of FIG. 21(b) is advanced than the waveform of FIG. 21(f) by 90 degrees.

Accordingly, the demodulation can be realized by utilizing the signals shown in FIGS. 21(b) and 21(f) in a demodulation system which carries out a demodulation by limiting amplitudes of the conventional I-signal and Q-signal.

Namely, the demodulation is executed by combining the output signal 212 from the signal selecting circuit 210 with the control signal 211 in the mixer 240 shown in FIG. 8 and further supplying its output signal 241 and the signal 212 to the conventional digital demodulation circuit.

EIGHTH EMBODIMENT

Figure 27:
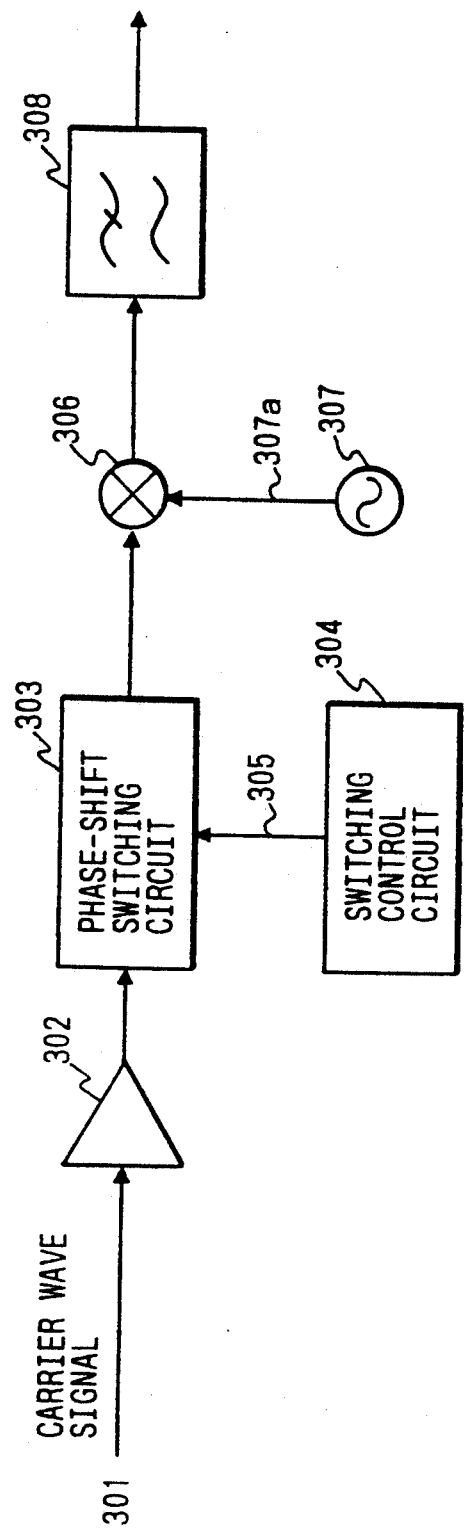
FIG. 27 is a circuit block diagram showing essential components of an FSK data receiving system in accordance with an eighth embodiment of the present invention.

FIG. 27 shows essential components of an FSK data receiving system in accordance with an eighth embodiment of the present invention.

In FIG. 27, a reference numeral 301 denotes a carrier wave signal, and a reference numeral 302 denotes a low-noise amplifier. A reference numeral 303 denotes a phase-shift switching circuit, and a reference numeral 304 denotes a switching control circuit. A reference numeral 306 denotes a mixer, and a reference numeral 307 denotes a local oscillator. And, a reference numeral 308 denotes a low-pass filter.

The carrier wave signal 301 is amplified in the low-noise amplifier 302 and inputted into the phase-shift switching circuit 303. The phase-shift switching circuit 303 shifts a phase of the input signal by an amount of 0° or 90° in response to a switching control signal 305 generated from the switching control circuit 304. An output signal from the phase-shift switching circuit 303 is inputted into the mixer 306.

On the other hand, the local oscillator 307 generates a local oscillator signal 307a having substantially the same frequency as the carrier wave signal 301. The local oscillator signal 307a is inputted into the mixer 306.

Though the mixer 306 generates both a signal having a frequency twice as large as the carrier wave signal and a base-band signal, only the base-band signal is outputted by being selected by the low-pass filter 308.

Figure 28:
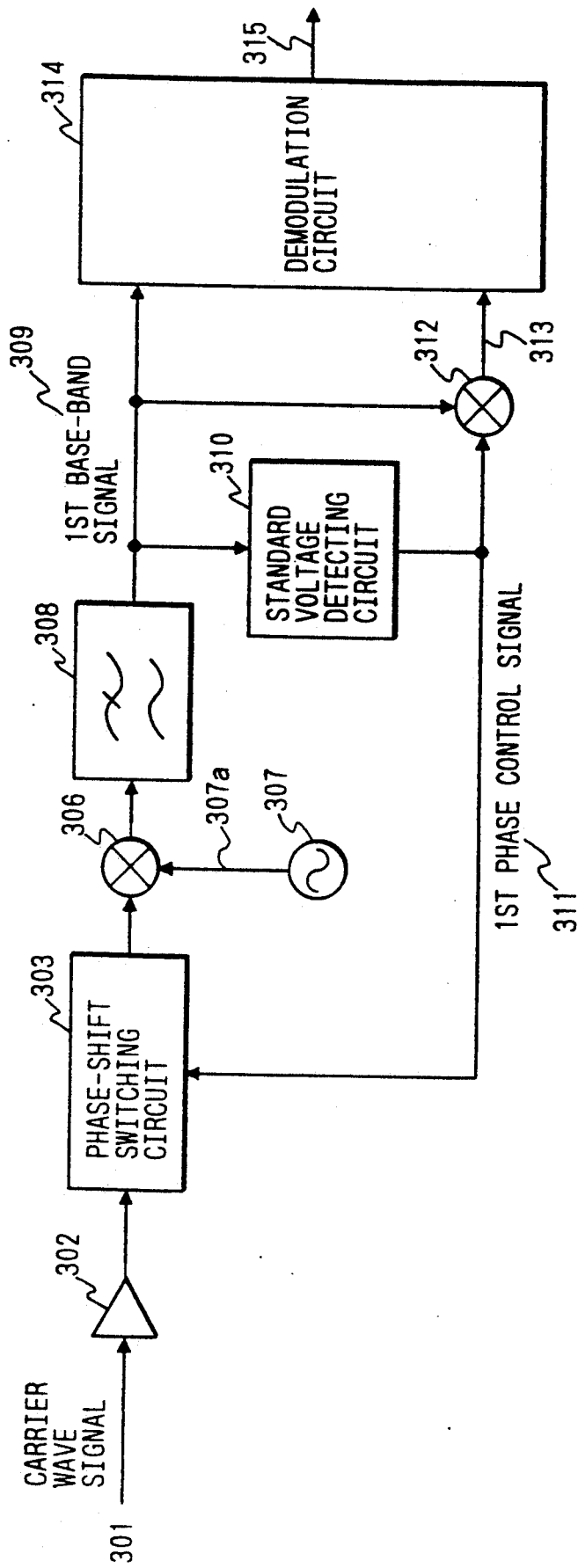
FIG. 28 is a more detailed circuit diagram showing the FSK data receiving system in accordance with the eight embodiment.

FIG. 28 shows a detailed circuit diagram of the FSK data receiving system in accordance with this eight embodiment.

In FIG. 28, a reference numeral 309 denotes a first base-band signal, and a reference numeral 310 denotes a standard voltage detecting circuit. A reference numeral 311 denotes a first phase control signal, and a reference numeral 312 denotes a base-band mixer. A reference numeral 313 denotes a second base-band signal, and a reference numeral 314 denotes a demodulation circuit. And, a reference numeral 315 denotes a first demodulation signal.

The low-pass filter 308 outputs the first base-band signal 309. The first base-band signal 309 is inputted into the standard voltage detecting circuit 310. The standard voltage detecting circuit 310 generates the first phase control signal 311.

The phase-shift switching circuit 303 responses to the first phase control signal 311 so as to change the phase of the carrier wave signal 301. The base-band mixer 312 inputs the first base-band signal 309 and the first phase control signal 311 and outputs the second base-band signal 313. The demodulation circuit 314 inputs the first base-band signal 309 and the second base-band signal 313 and outputs the demodulation signal 315.

An operation of thus constituted FSK data receiving system is explained with reference to FIGS. 29(a)~29(f).

Figure 29:
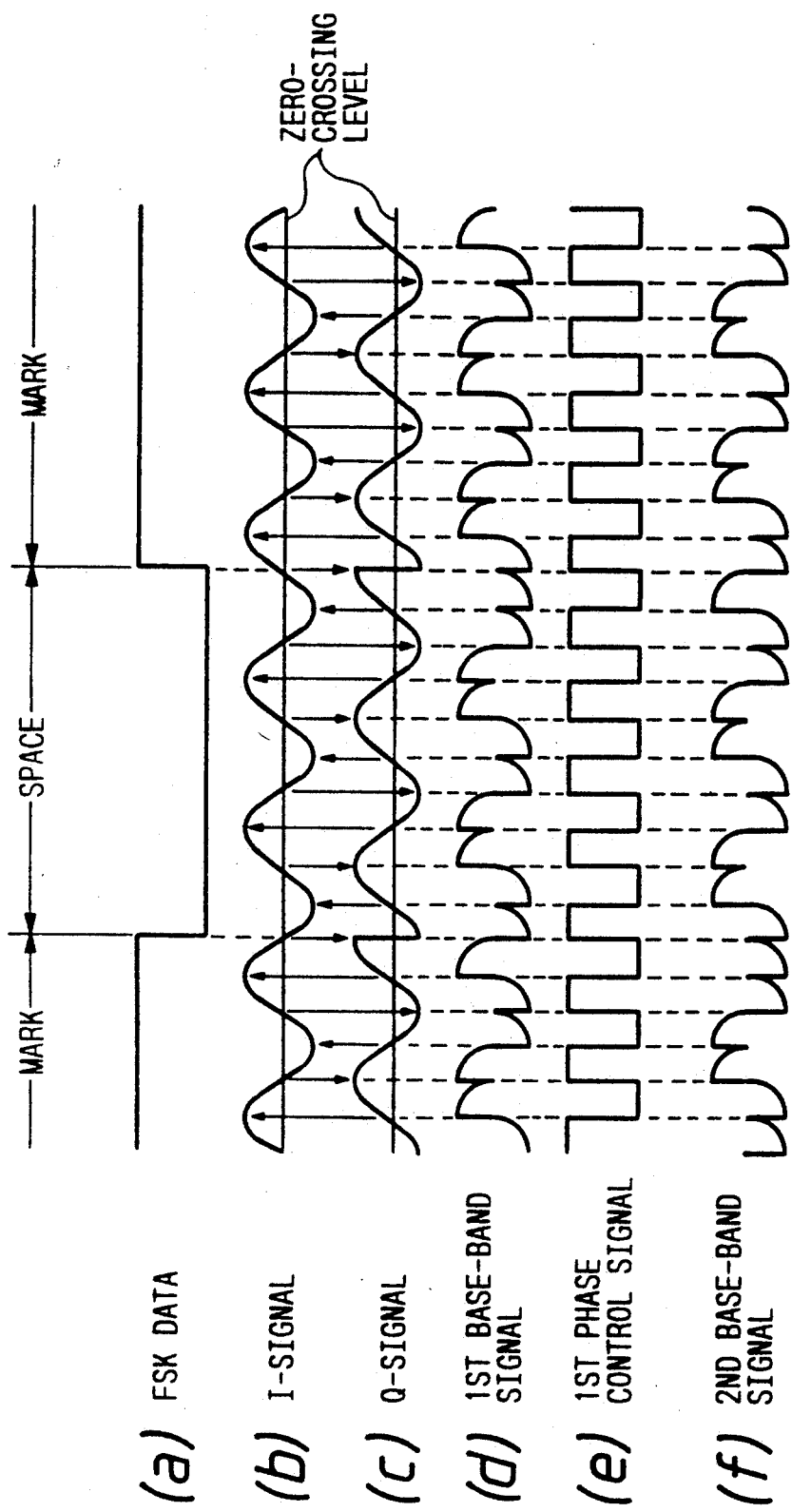
FIGS. 29(a)~29(f) are views showing signal waveforms of essential portions of the FSK data receiving system in accordance with the eight embodiment of the present invention.

First of all, the carrier wave signal 301 which is FSK-modulated in accordance with a data signal shown in FIG. 29(a) passes the phase-shift switching circuit 303 and, in turn, is inputted into the mixer 306 to generate the base-band signal. And, subsequently, this base-band signal is supplied to the low-pass filter 308 to generate the first base-band signal 309 (FIG. 29(d)).

In this embodiment, a standard voltage of the standard voltage detecting circuit 310 is set to be 0 V. Therefore, the standard voltage detecting circuit 310 detects a zero-crossing point of the first base-band signal 309 where the first base-band signal 309 crosses 0 V.

At the timing the zero-crossing point is detected, an output signal of the standard voltage detecting circuit 310; i.e. the first phase control signal 311 (FIG. 29(e)), is changed its value stepwise.

In this case, it is desirable for the standard voltage detecting circuit 310 not to detect unnecessary zero-crossing points occurring due to noises during the phase switching operation or a time-lag of the phase switching operation itself. For avoiding such a malfunction, the standard voltage detecting circuit 310 of the present embodiment is constituted to inhibit a detecting operation during a predetermined time period shortly after the zero-crossing point has been detected. For example, FIG. 3 shows a detailed circuit constitution for realizing the above-described function.

The phase-shift switching circuit 303 serves to change over the phase of the carrier wave signal 301 between 0° and 90° in response to the first phase control signal 311. The first base-band signal 309 and the first phase control signal 311 are mixed in the base-band mixer 312 to generate the second base-band signal 313 (FIG. 29(f)).

By the way, an I-signal and a Q-signal respectively shown in FIG. 29(b) and 29(c) are base-band signals used in the conventional quadrature demodulation.

In this embodiment, if these I/Q signals are alternately switched in response to the sign of the first phase control signal 311, a next zero-crossing point is generated after a time corresponding basically to a subsequent 90-degree phase. And a waveform signal whose positive or negative depends on the FSK-modulated data is outputted as the first base-band signal 309.

In the case where the FSK-modulated data is "mark", the second base-band signal 313 is delayed with respect to the first base-band signal 309 to have a waveform which is delayed by an amount corresponding to 90-degree phase of the I/Q signal. Furthermore, in the case where the FSK-modulated data is "space", the second base-band signal 313 is advanced with respect to the first base-band signal 309 to have a waveform which is advanced by an amount corresponding to 90-degree phase of the I/Q signal.

In this manner, the phase relationship between two signals changes +90 degree or −90 degree in accordance with a data value of "mark" or "space" of the FSK-modulated data. Therefore, in the same manner as the I/Q signals in the conventional quadrature demodulation, if either signal is advanced or delayed against another one, these two signals become mutually in-phase or opposite-phase in response to the FSK-modulation data. That is, a demodulation can be carried out by shifting or delaying either one of these signals by 90 degrees and then mixing them with each other. Accordingly, the demodulation circuit 314 can be constituted by almost any type of circuits as long as they can execute a conventional demodulation operation.

NINTH EMBODIMENT

Figure 30:
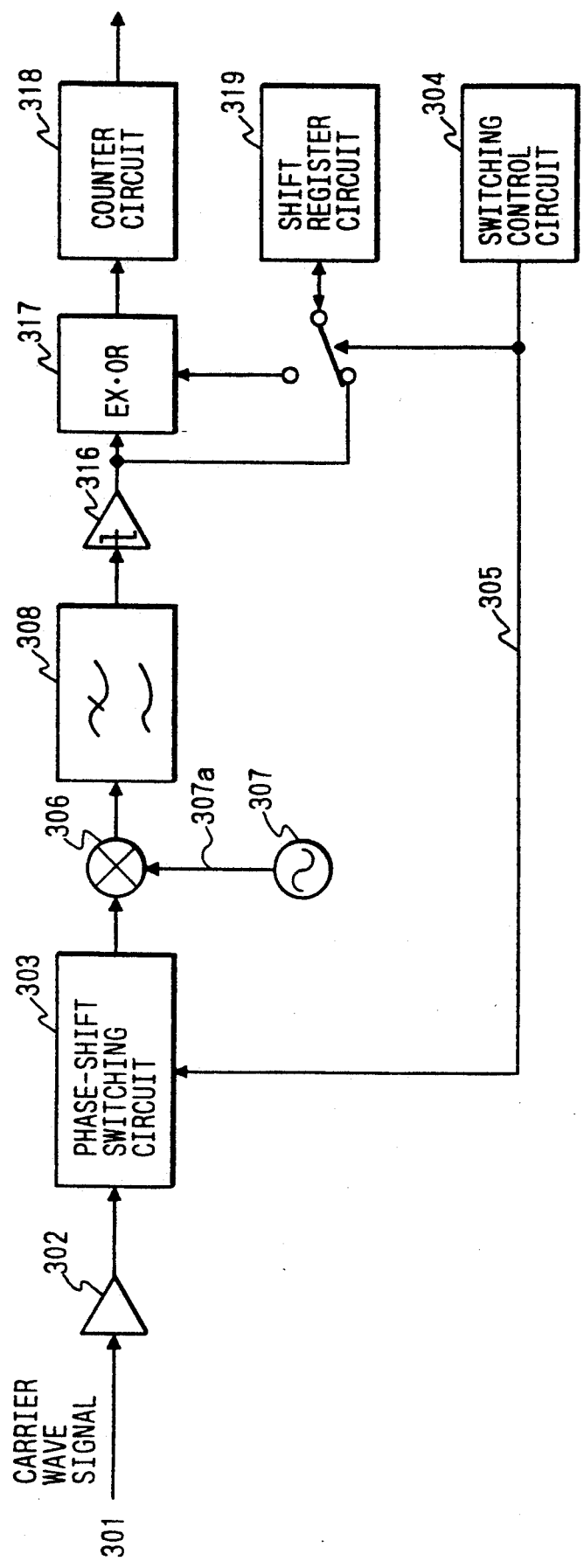
FIG. 30 is a circuit diagram showing essential components of an FSK data receiving system in accordance with a ninth embodiment of the present invention.

FIG. 30 shows an FSK data receiving system in accordance with a ninth embodiment of the present invention.

In FIG. 30, a reference numeral 301 denotes a carrier wave signal, and a reference numeral 302 denotes a low-noise amplifier. A reference numeral 303 denotes a phase-shift switching circuit, and a reference numeral 304 denotes a switching control circuit. A reference numeral 306 denotes a mixer, and a reference numeral 307 denotes a local oscillator. And, a reference numeral 308 denotes a low-pass filter. These components are the same as those of the eighth embodiment.

A reference numeral 316 denotes a limiter amplifier, and a reference numeral 317 denotes an exclusive-OR circuit. A reference numeral 318 denotes a counter circuit, and a reference numeral 319 denotes a shift register.

An operation of this embodiment is explained hereinafter. In a first-half of an FSK-modulated 1-bit data, the phase-shift switching circuit 303 is set to 0°. And the FSK-modulated data is converted into a base-band signal in the mixer 306 and subsequently sent through the low-pass filter 308, the limiter amplifier 316 to the shift register circuit 319 to store its waveform.

On the other hand, in a second-half of the FSK-modulated 1-bit data, the phase-shift switching circuit 303 is set to 90°. And, in the same manner, the FSK-modulated data is shaped its waveform through the mixer 306, the low-pass filter 308, and the limiter amplifier 316.

The first-half waveform of the FSK-modulated 1-bit data which is previously stored in the shift register circuit 319 is read out from a last written part (last-in last-out) by being offset by an amount of 90°. Then, thus read out waveform is supplied together with the second-half waveform of the FSK-modulated 1-bit data to the exclusive-OR circuit 317.

An output base-band signal from the exclusive-OR circuit 317 changes +90°/−90° in accordance with the FSK-modulated signal data by the 0°/90° phase change of the local oscillator signal 307a.

By reading out the waveform stored in the shift register 319 by offsetting 90°, the read out signal becomes the same-phase or the opposite-phase with respect to the carrier wave signal 301 being switched by an amount of 0°/90° in the phase-shift switching circuit 303. Therefore, by checking an exclusive-OR result of these signals, a judgement of "mark"/"space" becomes possible.

Figure 31A:
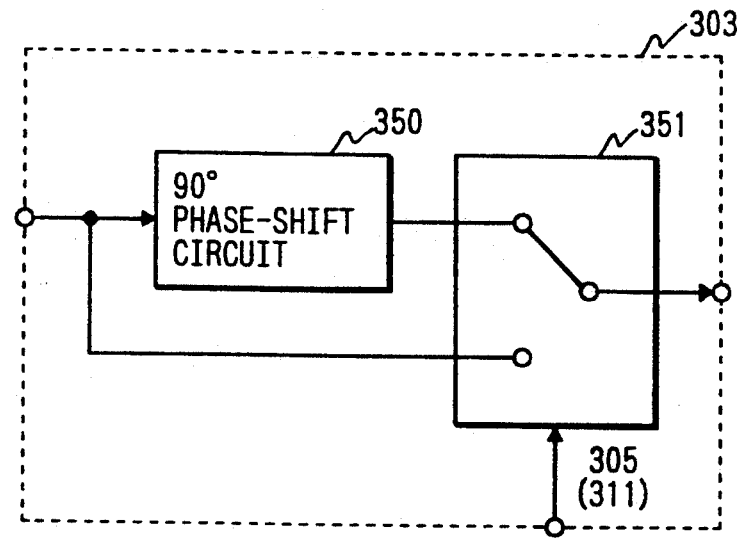
FIGS. 31(a) and 31(b) are circuit diagrams showing examples of a phase-shift switching circuit adopted in the eight and the ninth embodiment of the present invention.
Figure 31B:
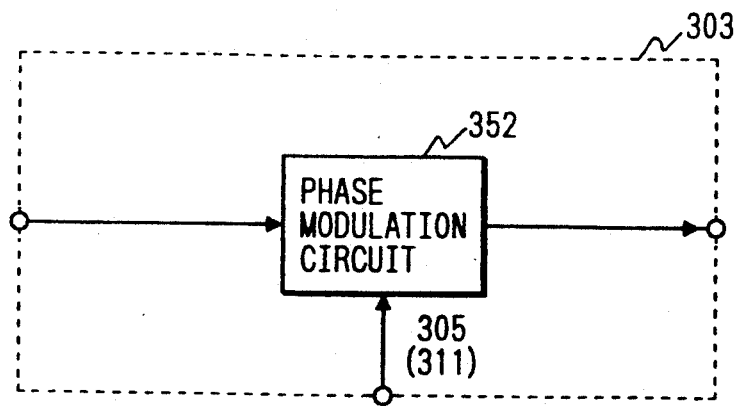
Figure 32:
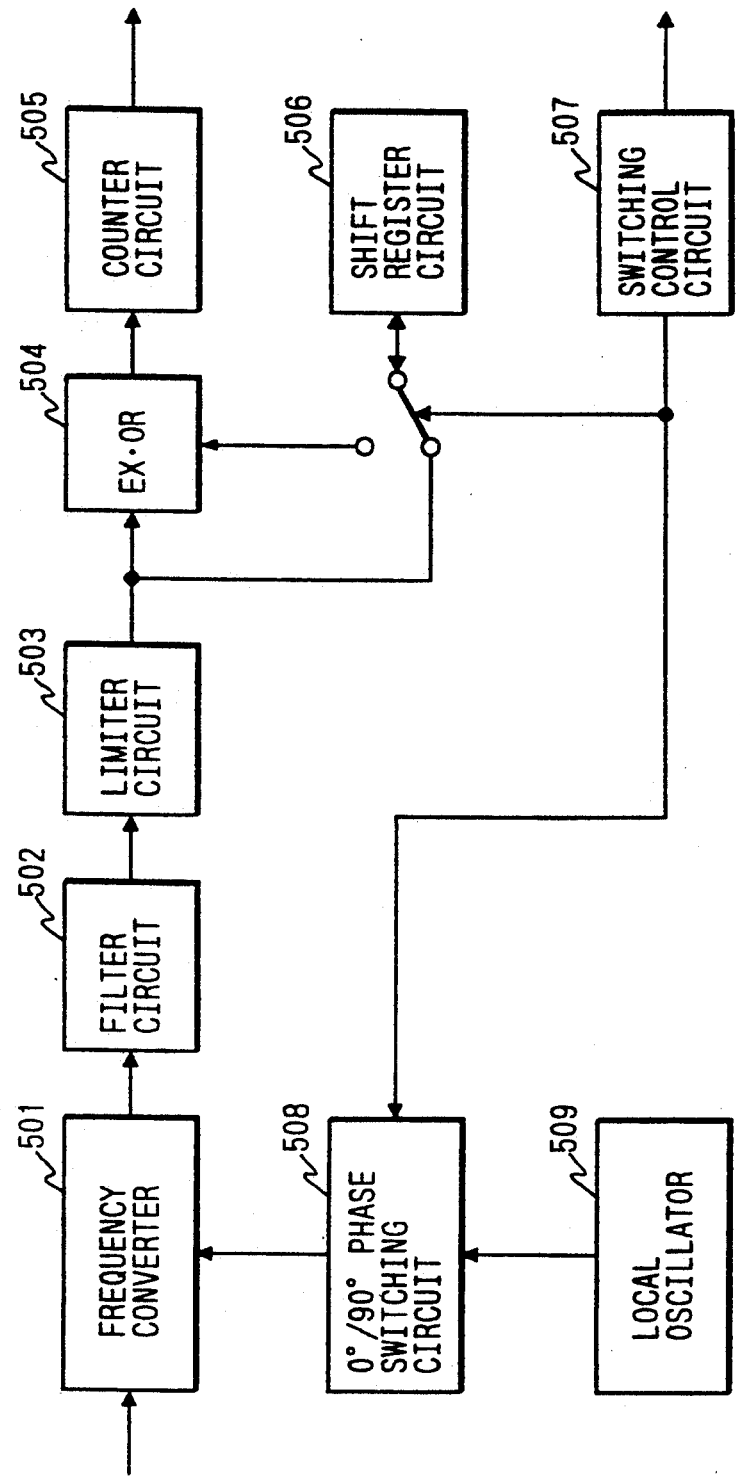
FIG. 32 is a circuit block diagram showing a conventional FSK data receiving system.
Figure 33:
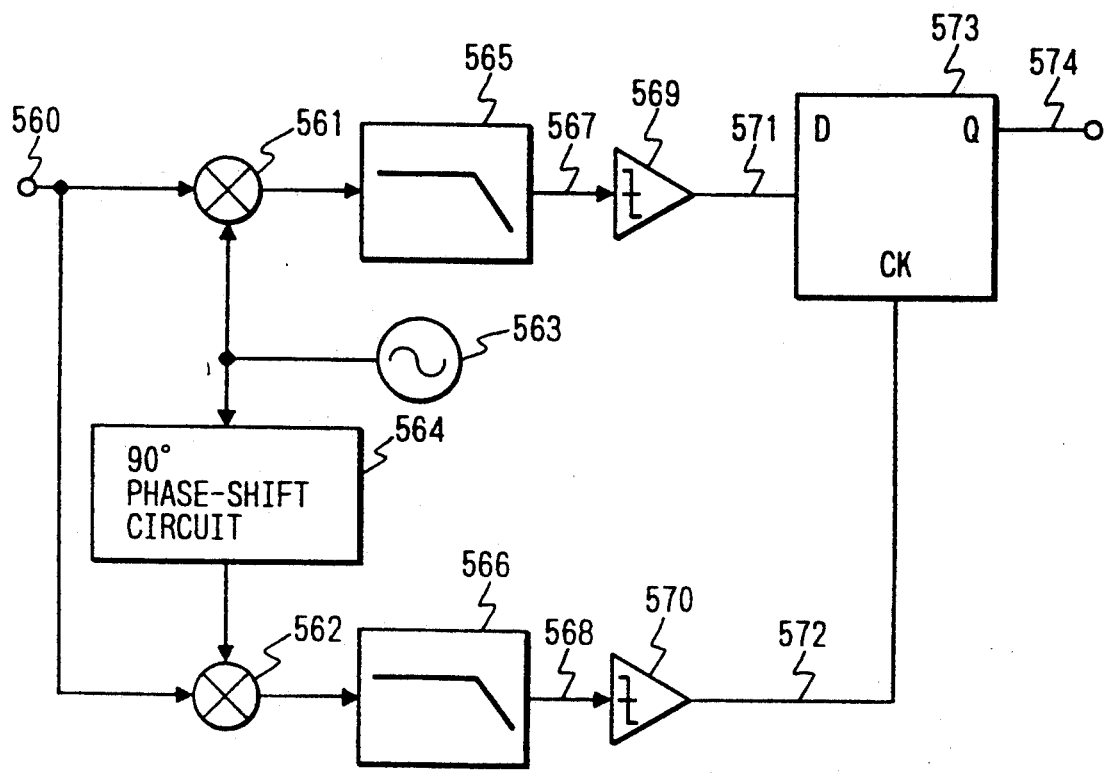
FIG. 33 is a circuit block diagram showing another conventional FSK data receiving system.

FIGS. 31(a) and 31(b) show examples of the phase-shift switching circuit 303 which adopted in the eighth and ninth embodiments of the present invention.

In FIG. 31(a), a reference numeral 350 denotes a 90° phase-shift circuit, and a reference numeral 351 denotes a analogue switch. An input signal of the phase-shift switching circuit 303 is on one hand supplied directly to one input terminal of the analogue switch 351, and is on the other hand supplied to the other input terminal of the analogue switch 351 through the 90° phase-shift circuit 350.

The analogue switch 351 selectively connects either input terminal to its output terminal in response to the switching control signal 305 (or the first phase control signal 311), so that a desired phase-shift function can be realized.

In FIG. 31(b), a reference numeral 352 denotes a phase modulation circuit. In this example, an input signal of the phase-shift switching circuit 303 is supplied to the phase modulation circuit 352. And, an output signal being phase-modulated by 0° or 90° is generated in response to the switching control signal 305 (or the first phase control signal 311), so that a desired phase-shift function can be realized.

MISCELLANEOUS

By the way, it is apparent that the data demodulation system in accordance with the present invention is effective even if it is used for receiving another transmission data such as PSK-modulated data as long as they are modulated with frequency deviations.

Furthermore, though the receiving system is explained as the direct conversion receiving system, the data demodulation system in accordance with the present invention can be applied to a heterodyne type receiver if the carrier wave signal are intermediate-frequency signals.

Moreover, the local oscillator can generate a local oscillator signal having an average frequency of the "mark" frequency and the "space" frequency instead of the frequency equal to the carrier wave signal frequency.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A data receiving system comprising:
    a carrier wave signal being modulated with a frequency deviation;
    a local oscillator means generating a local oscillator signal having substantially the same frequency as said carrier wave signal;
    a mixer means for producing a base-band signal by mixing said local oscillator signal and said carrier wave signal;
    a standard voltage detecting means which detects a standard voltage of said base-band signal so as to change its output signal at the timing the standard voltage is detected;
    a phase control means which is provided between said local oscillator means and said mixer means for shifting a phase of the local oscillator signal by an amount of 0° or 90° in response to the output signal from the standard voltage detecting means;
    a first base-band mixer means for mixing said base-band signal and said output signal from said standard voltage detecting means; and
    a first demodulation means for executing a demodulation on the basis of said base-band signal and an output signal from said first base-band mixer.

2. A data receiving system in accordance with claim 1 in which said standard voltage of the standard voltage judging means is set to be 0 V.

3. A data receiving system in accordance with claim 1 in which said output signal of the standard voltage judging means is a signal having two values inverted stepwise every time when the standard voltage is detected.

4. A data receiving system in accordance with claim 1 in which said the standard voltage judging means inhibits its detecting operation during a predetermined period of time after the standard voltage has been detected.

5. A data receiving system in accordance with claim 1 in which said phase control means is a phase switching circuit which changes over the phase of the local oscillator means between 0° and 90°.

6. A data receiving system in accordance with claim 1 in which said phase control means is a phase modulation circuit which modulates the phase of the local oscillator means by an amount of 0° or 90°.

7. A data receiving system in accordance with claim 1 further comprises a limiter amplifier means for limiting an amplitude of said base-band signal, an exclusive-OR means for generating an exclusive-OR result from an output of said limiter amplifier means and the output of said standard voltage detecting means so as to serve as said first base-band mixer means, and a first demodulation means for executing a demodulation on the basis of a phase relationship between the output signal from said limiter amplifier and an output from said exclusive-OR means.

8. A data receiving system in accordance with claim 1 in which said first demodulation means is constituted by a 90° delay means for delaying the base-band signal or the output signal from the first base-band mixer means.

9. A data receiving system in accordance with claim 1 in which said first demodulation means is constituted by a 90° phase-shift means for shifting a phase of the base-band signal or the output signal from the first base-band mixer means.

10. A data receiving system in accordance with claim 1 in which said first demodulation means includes a second base-band mixer means for mixing the base band signal and its phase-shifted signal by an amount of 90 degrees and a third base-band mixer means for mixing an output signal from said second base-band mixer means and the output signal from said standard voltage detecting means, and executes a data decoding operation based on the third base-band mixer means.

11. A data receiving system comprising:
a carrier wave signal being modulated with a frequency deviation;
a local oscillator means generating a local oscillator signal having substantially the same frequency as said carrier wave signal;
a mixer means for producing a base-band signal by mixing said local oscillator signal and said carrier wave signal;
a standard voltage detecting means which detects a standard voltage of said base-band signal so as to change its output signal at the timing the standard voltage is detected;
a phase control means which is provided between said local oscillator means and said mixer means for shifting a phase of the local oscillator signal by an amount of 0° or 90° in response to the output signal from the standard voltage detecting means;
a limiter amplifier means for limiting an amplitude of said base-band signal;
a first base-band mixer means for mixing an output signal from said limiter amplifier means and the output signal from the standard voltage detecting means;
a first demodulation means for executing a demodulation on the basis of said base-band signal, an output signal from said first base-band mixer, and the output signal from the standard voltage detecting means.

12. A data receiving system in accordance with claim 11 in which said first demodulation means includes a phase-shift means for shifting a phase of either the output signal of said limiter amplifier means or the output signal of said first base-band mixer by an amount of 90 degrees, and a mixer means for mixing an output signal from said phase-shift means and the other of the output signal of said limiter amplifier means and the output signal of said first base-band mixer.

13. A data receiving system in accordance with claim 12 in which said phase-shift means is constituted by a register circuit inputting the output signal from the standard voltage detecting means as its clock signal.

14. A data receiving system in accordance with claim 11 in which said first demodulation means includes a delay means for delaying a phase of either the output signal of said limiter amplifier means or the output signal of said first base-band mixer by an amount of 90 degrees, and a mixer means for mixing an output signal from said phase-shift means and the other of the output signal of said limiter amplifier means and the output signal of said first base-band mixer.

15. A data receiving system in accordance with claim 11 in which said first demodulation means includes a second base-band mixer means for mixing the output signal of said first base-band mixer and its phase-shifted signal by an amount of 90 degrees and a third base-band mixer means for mixing an output signal from said second base-band mixer means and the output signal from said standard voltage detecting means, and executes a data decoding operation based on the third base-band mixer means.

16. A data receiving system in accordance with claim 1 further includes, in addition to said first demodulation circuit, a frequency judging means for judging a frequency of the output signal from said standard voltage judging means, a control signal generating means for obtaining a first control signal based on an output signal from said frequency judging means, a second demodulation means which inputs an output signal of the frequency judging means and an output signal of the first demodulation means and outputs a second demodulation signal by selecting either an inverted/non-inverted output signal of the frequency judging means or the output signal of the first demodulation means based on a judgement of an in-phase/opposite-phase relationship between the output signal of the frequency judging means and the output signal of the first demodulation means, whereby a third demodulation signal is obtained from said first and second demodulation signals in accordance with a first control signal so that a data decoding operation can be realized by utilizing the third demodulation signal.

17. A data receiving system comprising:
a carrier wave signal being modulated with a frequency deviation;
a local oscillator means generating a local oscillator signal having substantially the same frequency as said carrier wave signal;
a mixer means for producing a base-band signal by mixing said local oscillator signal and said carrier wave signal;
a standard voltage detecting means for detecting a standard voltage of said base-band signal;
a pulse generating means for generating a pulse having a width corresponding to a predetermined period of time;
a phase control means which is provided between said local oscillator means and said mixer means for shifting a phase of the local oscillator signal by an amount of 0° or 90° in response to an output signal from the pulse generating means;
a fourth demodulation means for executing a demodulation operation on the basis of a sign change of the base-band signal with respect to the standard voltage in any one or both of the changing points of said 0° and 90° phase-shifts.

18. A data receiving system in accordance with claim 17 in which said the standard voltage judging means inhibits its detecting operation during a predetermined period of time after the standard voltage has been detected.

19. A data receiving system in accordance with claim 17 in which said phase control means is a phase switching circuit which changes over the phase of the local oscillator means between 0° and 90°.

20. A data receiving system in accordance with claim 17 in which said phase control means is a phase modulation circuit which modulates the phase of the local oscillator means by an amount of 0° or 90°.

21. A data receiving system in accordance with claim 17 in which said fourth demodulation means executes the demodulation by judging whether or not a sign of the base-band signal is changed before and after the local oscillator signal is shifted from 0° to 90° or vice versa by the phase control means.

22. A data receiving system in accordance with claim 17 further includes, in addition to said fourth demodulation circuit, a pulse number judging means for judging a pulse number of the output signal from said pulse generating means, a control signal generating means for obtaining a second control signal based on an output signal from said pulse number judging means, a fifth demodulation means which inputs an output signal from the pulse number judging means and an output signal of the fourth demodulation means and outputs a fifth demodulation signal by selecting either an inverted/non-inverted output signal of the pulse number judging means or the output signal of the fourth demodulation means based on a judgement of an in-phase/opposite-phase relationship between the output signal of the pulse number judging means and the output signal of the fourth demodulation means, whereby a sixth demodulation signal is obtained from said fourth and fifth demodulation signals in accordance with a second control signal so that a data decoding operation can be realized by utilizing the sixth demodulation signal.

23. A data receiving system comprising:
- a first and a second base-band signals which have quadrature phases with each other and whose phase relationship is relatively inverted in accordance with a positive and a negative frequency deviations of a carrier wave signal;
- a signal selecting means for inputting said first and second base-band signals and alternately selecting either of them to generate a third base-band signal;
- a standard voltage detecting means for comparing the third base-band signal with a standard voltage to generate a control signal when the third base-band signal crosses the standard voltage;
- a sign change judging means for inputting said control signal and said third base-band signal to make a judgement of whether or not a sign of the third base-band signal is changed before and after a changing point of the control signal; and
- a mixer means for mixing a judging signal outputted from said sign change judging means and said control signal.

24. A data receiving system in accordance with claim 23 in which said signal selecting means includes a limiter amplifier and a three-state circuit.

25. A data receiving system in accordance with claim 23 in which said signal selecting means includes an analogue switching circuit and a limiter amplifier.

26. A data receiving system in accordance with claim 23 in which said mixer means includes an exclusive-OR circuit having an input terminal connected to an input terminal of said mixer means and an output terminal connected to an output terminal of the mixer means.

27. A data receiving system in accordance with claim 23 in which said mixer means includes a mixer having a first and a second input terminals and a limiter amplifier, and said first and second input terminals of said mixer are connected to input terminals of the mixer means, and an output signal of said mixer is supplied to said limiter amplifier, and further an output terminal of the limiter amplifier is connected to an output terminal of said mixer means.

28. A data receiving system in accordance with claim 23 in which said standard voltage detecting means includes an edge detecting circuit which detects a sign change of said third base-band signal, a first D-type flip-flop circuit which inputs an output signal from said edge detecting circuit as a clock input signal, and an inverted output signal of said first D-type flip-flop circuit is used as a data input signal of said first D-type flip-flop circuit so that an output signal of said standard voltage detecting means is fed from an output terminal of said first D-type flip-flop circuit whose output is inverted alternately in response to said clock input signal.

29. A data receiving system in accordance with claim 23 in which said sign change judging means includes an edge detecting circuit which inputs said control signal, a second D-type flip-flop circuit having a data input terminal which inputs said third base-band signal, a third D-type flip-flop circuit having a data input terminal which inputs an output signal from said second D-type flip-flop circuit, said second and third D-type flip-flop circuits having clock input terminals which input an output signal from said edge detecting circuit, and a first exclusive-OR circuit which inputs output signals from said second and third D-type flip-flop circuits and outputs a signal to an output terminal of said sign change judging circuit.

30. A data receiving system in accordance with claim 28 in which said edge detecting circuit includes an even number of NOT circuits which delay an input signal of the edge detecting circuit, a second exclusive-OR circuit which compares the input signal of the edge detecting circuit and an output signal of said NOT circuits, and an input terminal of said NOT circuits is connected to an input terminal of said edge detecting circuit and an output terminal of said second exclusive-OR circuit is connected to an output terminal of said edge detecting circuit.

31. A data receiving system in accordance with claim 28 in which said edge detecting circuit includes a third exclusive-OR circuit having a first and a second input terminals, a capacitance element one end of which is connected to a first input terminal of said third exclusive-OR circuit and the other end of which is grounded, a resistance interposed between the first input terminal and a second input terminal of said third exclusive-OR circuit for detecting a current, said second input terminal of the third exclusive-OR circuit being connected to an input terminal of said edge detecting circuit, and said third exclusive-OR circuit having an output terminal connected to an output terminal of said edge detecting circuit.

32. A data receiving system comprising:
a first and a second base-band signals which have quadrature phases with each other and whose phase relationship is relatively inverted in accordance with a positive and a negative frequency deviations of a carrier wave signal;
a signal selecting means for inputting said first and second base-band signals and alternately selecting either of them to generate a third base-band signal;
a standard voltage detecting means for comparing the third base-band signal with a standard voltage to generate a control signal when the third base-band signal crosses the standard voltage;
a mixer means for mixing said third base-band signal and said control signal; and
a quadrature demodulation means for inputting said third base-band signal and an output signal from said mixer means.

33. A data receiving system in accordance with claim 32 in which said signal selecting means includes a limiter amplifier and a three-state circuit.

34. A data receiving system in accordance with claim 32 in which said signal selecting means includes an analogue switching circuit and a limiter amplifier.

35. A data receiving system in accordance with claim 32 in which said mixer means includes an exclusive-OR circuit having an input terminal connected to an input terminal of said mixer means and an output terminal connected to an output terminal of the mixer means.

36. A data receiving system in accordance with claim 32 in which said mixer means includes a mixer having a first and a second input terminals and a limiter amplifier, and said first and second input terminals of said mixer are connected to input terminals of the mixer means, and an output signal of said mixer is supplied to said limiter amplifier, and further an output terminal of said limiter amplifier is connected to an output terminal of said mixer means.

37. A data receiving system in accordance with claim 32 in which said standard voltage detecting means includes an edge detecting circuit which detects a sign change of said third base-band signal, a first D-type flip-flop circuit which inputs an output signal from said edge detecting circuit as a clock input signal, and an inverted output signal of said first D-type flip-flop circuit is used as a data input signal of said first D-type flip-flop circuit so that an output signal of said standard voltage detecting means is fed from an output terminal of said first D-type flip-flop circuit whose output is inverted alternately in response to said clock input signal.

38. A data receiving system in accordance with claim 37 in which said edge detecting circuit includes an even number of NOT circuits which delay an input signal of the edge detecting circuit, a second exclusive-OR circuit which compares the input signal of the edge detecting circuit and an output signal of said NOT circuits, and an input terminal of said NOT circuits is connected to an input terminal of said edge detecting circuit and an output terminal of said second exclusive-OR circuit is connected to an output terminal of said edge detecting circuit.

39. A data receiving system in accordance with claim 37 in which said edge detecting circuit includes a third exclusive-OR circuit having a first and a second input terminals, a capacitance element one end of which is connected to a first input terminal of said third exclusive-OR circuit and the other end of which is grounded, a resistance interposed between the first input terminal and a second input terminal of said third exclusive-OR circuit for detecting a current, said second input terminal of the third exclusive-OR circuit being connected to an input terminal of said edge detecting circuit, and said third exclusive-OR circuit having an output terminal connected to an output terminal of said edge detecting circuit.

40. A data receiving system comprising:
a carrier wave signal being modulated with a frequency deviation;
a control signal generating means wherein, a standard voltage detecting means which detects a standard voltage of said first base-band signal and outputs the control signal to said phase-shift switching means;
a phase-shift switching means for switching a phase of the carrier wave signal;
a local oscillator means for generating a local oscillator signal having substantially the same frequency as the carrier wave signal;
a mixer means for mixing said local oscillator signal and an output signal from said phase-shift switching means;
a low-pass filter means for generating a first base-band signal from the output of the mixer means; and
a demodulation means for executing a demodulation operation based on said first base-band signal.

41. A data receiving system in accordance with claim 40 further includes a base-band mixer for mixing said first base-band signal and said control signal and outputting a second base-band signal to said demodulation means so that the demodulation operation can be executed based on said second base-band signal together with said first base-band signal.

42. A data receiving system in accordance with claim 40 further includes a limiter amplifier for inputting said first base-band signal, and the demodulation can be executed based on an output signal from said limiter amplifier.

43. A data receiving system in accordance with claim 40 in which said phase-shift switching means includes a 90° phase-shift means for shifting a phase of the carrier wave signal by 90° and an analogue switching means for selecting either the carrier wave signal or an output signal from said 90° phase-shift means in response to the control signal.

44. A data receiving system in accordance with claim 40 in which said phase-shift switching means includes a phase modulation means for shifting a phase of the carrier wave signal by 0° or 90° in response to the control signal.

45. A data receiving system comprising:
an I base-band signal and a Q base-band signal which are used in a quadrature demodulation operation;
a means for detecting a standard voltage of respective base-band signals and generating a control signal in response to this detection;
a means for alternately selecting either said I base-band signal or said Q base-band signal in response to said control signal to generate an I/Q base-band signal; and
a means for executing a demodulation operation on the basis of said I/Q signal.

46. A data receiving system in accordance with claim 45 in which said standard voltage is set to be 0 V.

47. A data receiving system in accordance with claim 11 further includes, in addition to said first demodulation circuit, a frequency judging means for judging a frequency of the output signal from said standard voltage judging means, a control signal generating means for obtaining a first control signal based on an output signal from said frequency judging means, a second demodulation means which inputs an output signal of the frequency judging means and an output signal of the first demodulation means and outputs a second demodulation signal by selecting either an inverted/non-inverted output signal of the frequency judging means or the output signal of the first demodulation means based on a judgement of an in-phase/opposite-phase relationship between the output signal of the frequency judging means and the output signal of the first demodulation means, whereby a third demodulation signal is obtained from said first and second demodulation signals in accordance with a first control signal so that a data decoding operation can be realized by utilizing the third demodulation signal.

48. A data receiving system in accordance with claim 29 in which said edge detecting circuit includes an even number of NOT circuits which delay an input signal of the edge detecting circuit, a second exclusive-OR circuit which compares the input signal of the edge detecting circuit and an output signal of said NOT circuits, and an input terminal of said NOT circuits is connected to an input terminal of said edge detecting circuit and an output terminal of said second exclusive-OR circuit is connected to an output terminal of said edge detecting circuit.

49. A data receiving system in accordance with claim 29 in which said edge detecting circuit includes a third exclusive-OR circuit having a first and a second input terminals, a capacitance element one end of which is connected to a first input terminal of said third exclusive-OR circuit and the other end of which is grounded, a resistance interposed between the first input terminal and a second input terminal of said third exclusive-OR circuit for detecting a current, said second input terminal of the third exclusive-OR circuit being connected to an input terminal of said edge detecting circuit, and said third exclusive-OR circuit having an output terminal connected to an output terminal of said edge detecting circuit.

* * * * *